United States Patent
Riesselmann

(10) Patent No.: US 6,330,851 B1
(45) Date of Patent: Dec. 18, 2001

(54) ARRANGEMENT OF A PLURALITY OF FOOD-PREPARATION APPARATUSES

(76) Inventor: Gottfried Riesselmann, Achtern Diek 34, D-49377, Vechta (DE), D-49377

(*) Notice: Subject to any disclaimer, the term of this patent is extended or adjusted under 35 U.S.C. 154(b) by 0 days.

(21) Appl. No.: 09/347,992

(22) Filed: Jul. 6, 1999

Related U.S. Application Data

(63) Continuation of application No. 08/776,304, filed on May 19, 1997, now abandoned.

(30) Foreign Application Priority Data

| Jul. 21, 1994 | (DE) | 94 11 508 U |
| Aug. 24, 1994 | (DE) | 94 13 627 U |
| Aug. 24, 1994 | (DE) | 94 13 628 U |

(51) Int. Cl.[7] ............................ A23L 1/00; A47J 37/00
(52) U.S. Cl. ................... 99/339; 99/340; 99/419; 99/421 H; 99/421 V; 99/427; 99/448
(58) Field of Search .................... 099/337, 336, 099/339, 340, 338, 403–421 V, 400, 401, 427, 444–450, 482, 483; 126/25 R, 9 R, 41 R; 219/400, 702

(56) References Cited

U.S. PATENT DOCUMENTS

| Re. 23,874 | 9/1954 | Panken . |
| 1,263,331 | 4/1918 | Lindroth ............................ 99/446 |
| 2,245,220 | 6/1941 | Nelson . |
| 2,263,715 | 11/1941 | Bobo . |
| 2,387,621 | 10/1945 | Stangle . |
| 2,618,730 | 11/1952 | Panken .......................... 99/421 H |
| 2,636,431 | 4/1953 | Baltz . |
| 2,696,163 | 12/1954 | Galley ............................ 99/421 H |
| 2,762,293 | 9/1956 | Boyajian ........................ 99/421 P |
| 2,885,950 | 5/1959 | Stoll et al. ..................... 99/421 H |
| 3,104,605 | 9/1963 | McKinney ...................... 99/421 H |
| 3,125,015 | 3/1964 | Schlaegel ....................... 99/421 P |
| 3,196,776 | 7/1965 | Norton ........................... 99/421 P |
| 3,205,812 | 9/1965 | Booth ............................. 99/421 P |
| 3,296,957 | 1/1967 | Gagnon et al. .................... 99/444 |
| 3,333,529 | 8/1967 | Wilson ........................... 99/421 P |
| 3,832,989 | 9/1974 | Belford .......................... 126/25 R |
| 4,214,516 | 7/1980 | Friedl et al. ..................... 99/447 |
| 4,390,965 | 6/1983 | Albert . |
| 4,748,902 | 6/1988 | Maurantonio . |
| 5,018,438 | 5/1991 | Grandi . |
| 5,125,328 | 6/1992 | Grandi . |

FOREIGN PATENT DOCUMENTS

| 321445 | 6/1957 | (CH) . |
| 334973 | 2/1959 | (CH) . |
| 366138 | 1/1963 | (CH) . |
| 373539 | 1/1964 | (CH) . |
| 3304057 | 8/1984 | (DE) . |
| 910402 | 12/1989 | (DE) . |
| 9208001 | 7/1993 | (DE) . |
| 9413628 | 11/1995 | (DE) . |
| 88100835 | 10/1983 | (EP) . |
| 0278279 | 8/1988 | (EP) . |
| 2172257 | 9/1973 | (FR) . |
| 1140386 | 1/1969 | (GB) . |

OTHER PUBLICATIONS

Patent Abstracts of Japan, vol. 16, No. 480 (M–1321) Oct. 6, 1992 and JP, A, 04 174 221 (Matsushita Electric Ind. Co. Ltd.) Jun. 22, 1992.

*Primary Examiner*—Timothy F. Simone
(74) *Attorney, Agent, or Firm*—Martin A. Farber

(57) ABSTRACT

An arrangement (101) of a plurality of food preparation devices (102, 103, 104), e.g. steamers, boilers, grill units, roasting units or microwave devices, each of which can be set to a particular cooking time. To improve ease of use, the cooking time of all the devices is automatically adjustable, and a central switching unit (106) is provided and connected via a control line (102, 103, 104) and has a control unit for the automatic adjustment of different cooking times and/or start times for the devices (102, 103, 104).

37 Claims, 15 Drawing Sheets

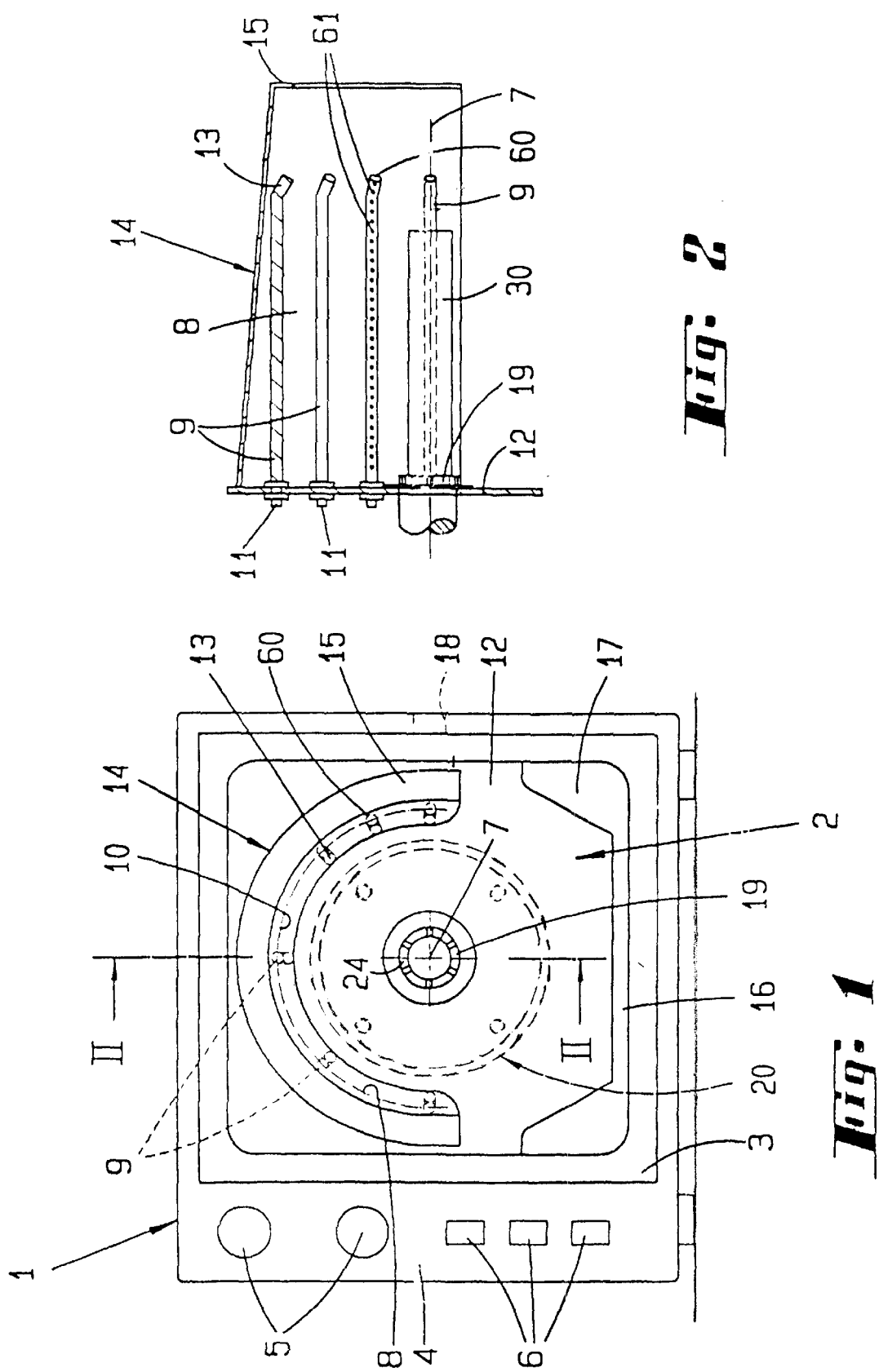

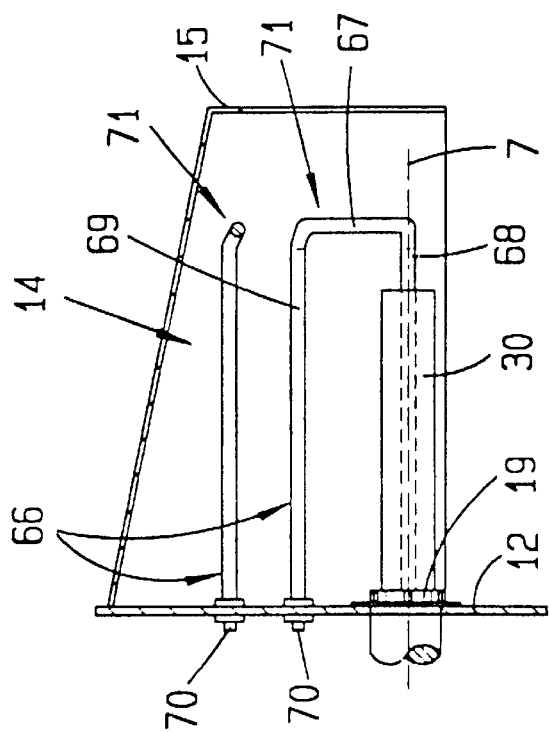
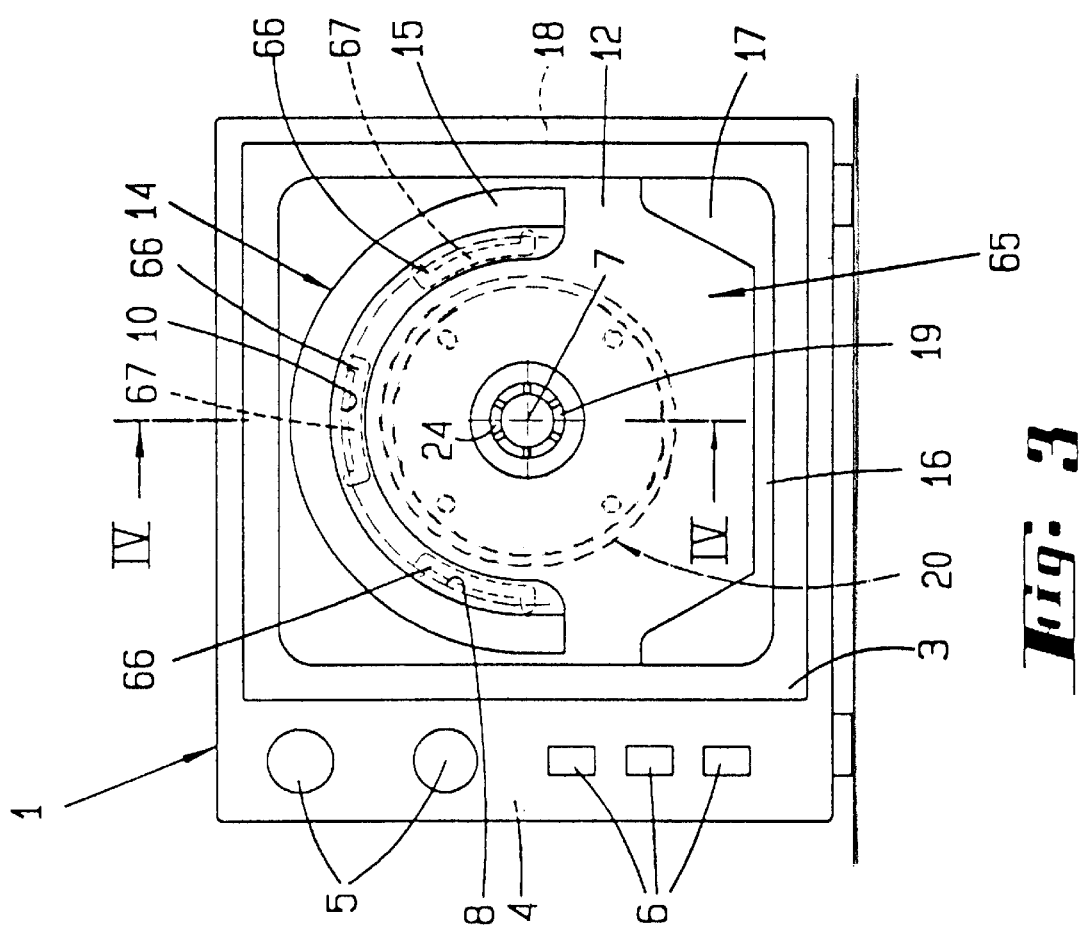
Fig. 4
Fig. 3

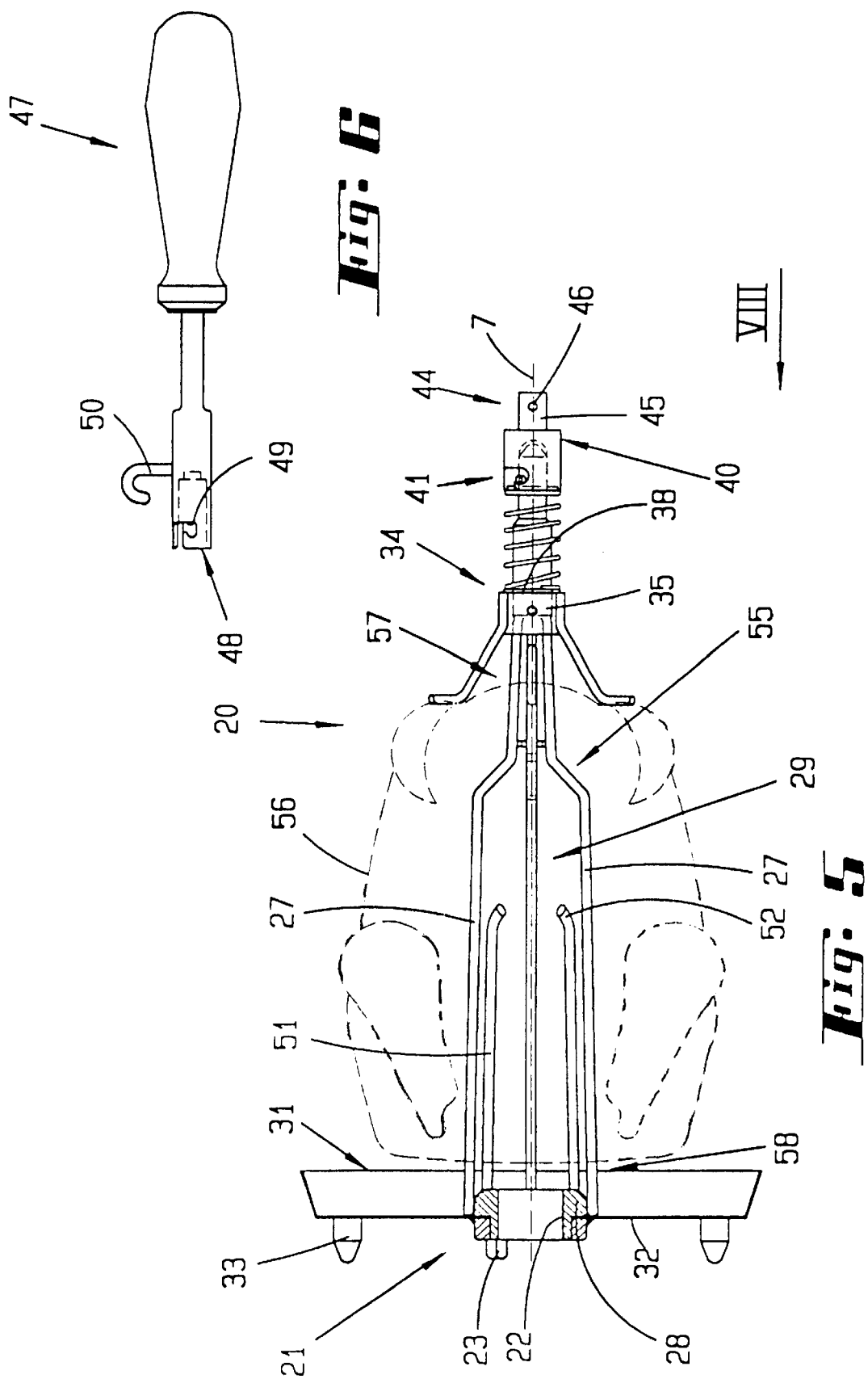

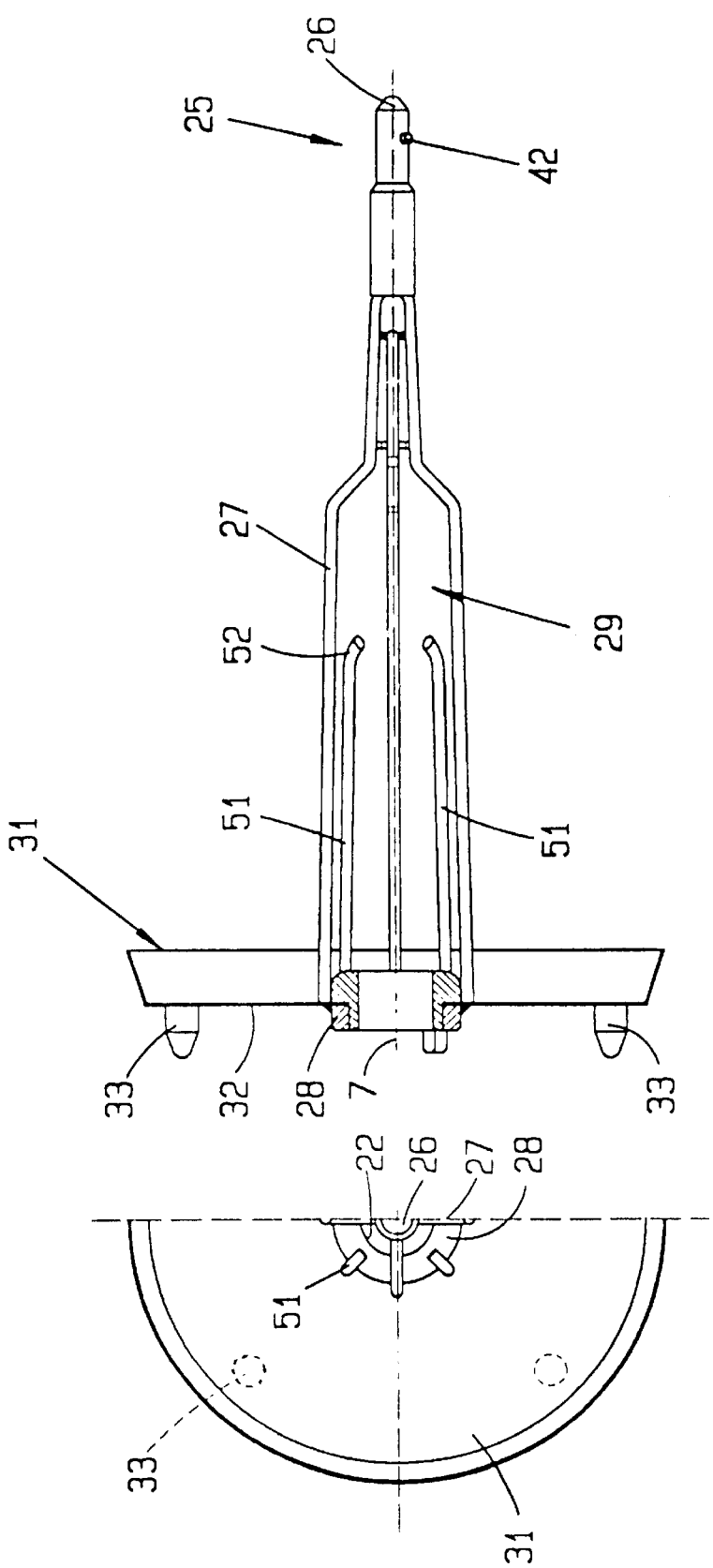

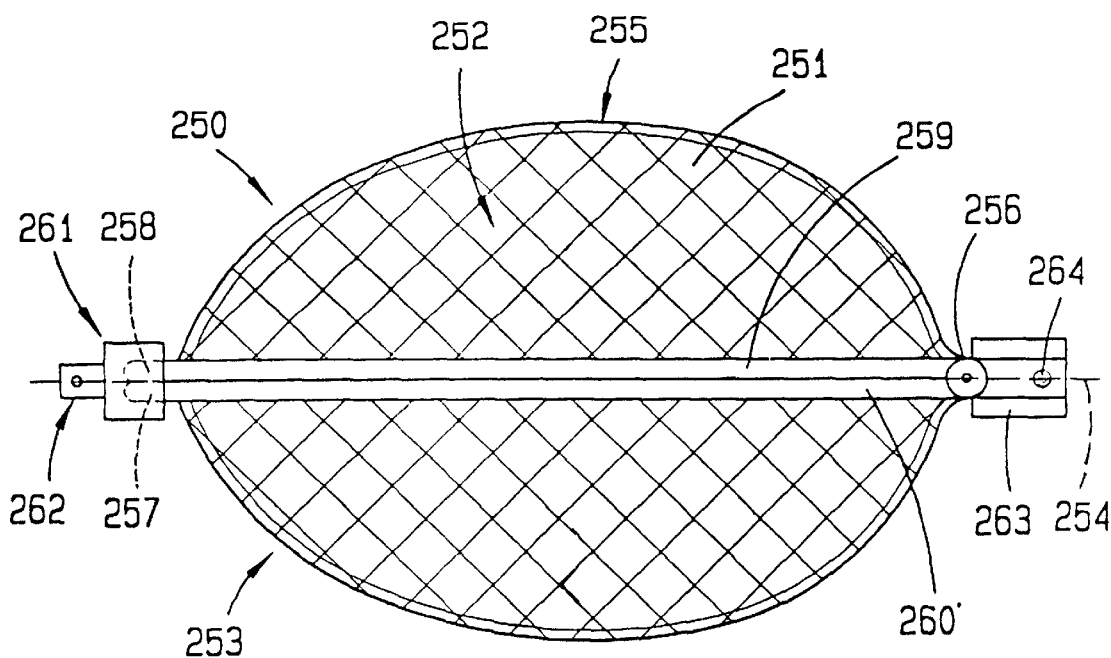
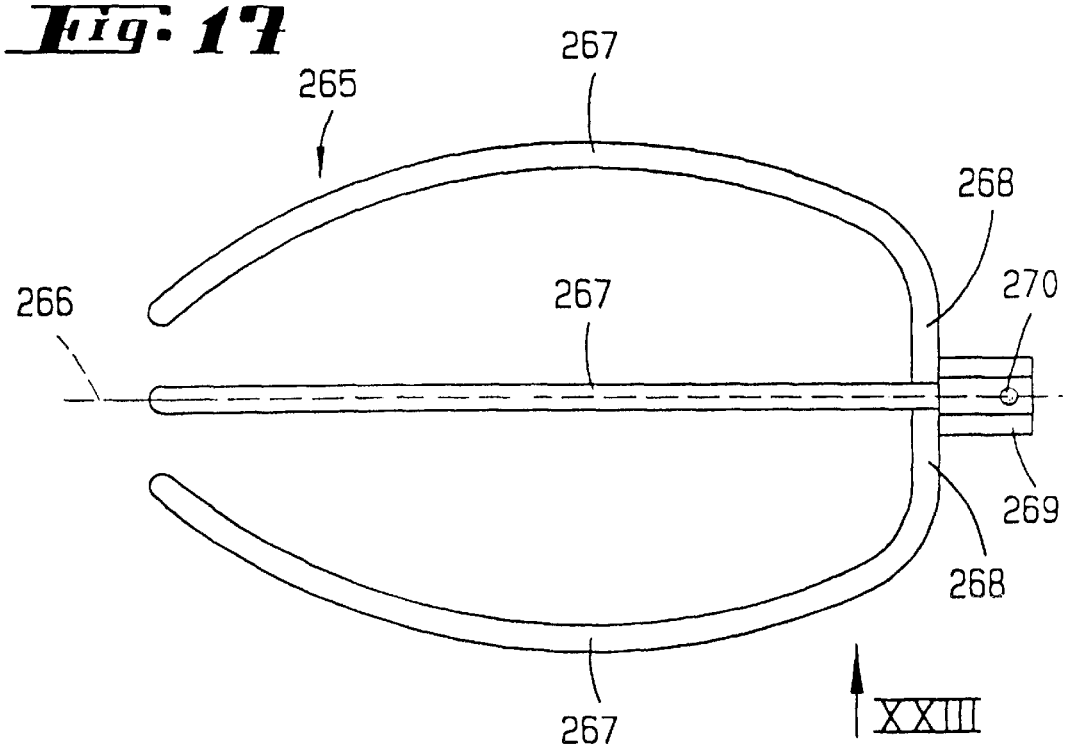

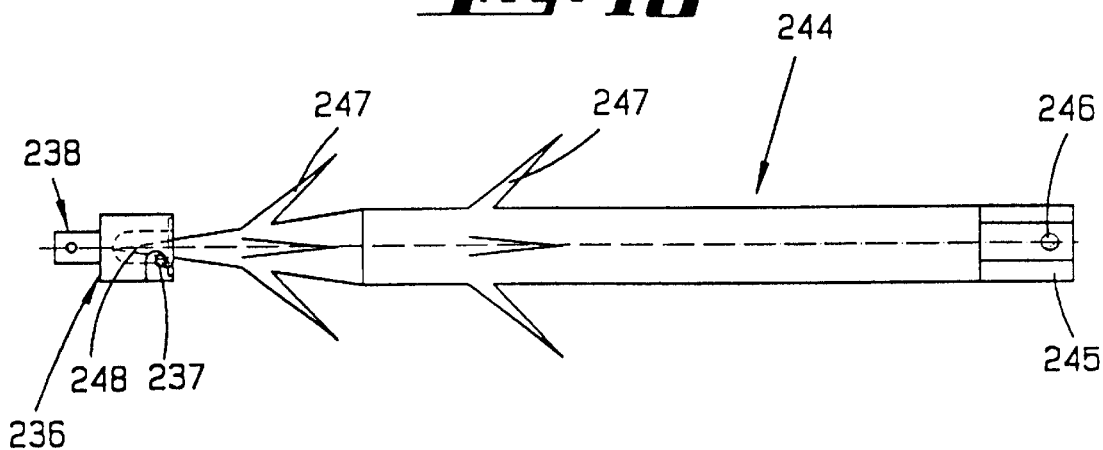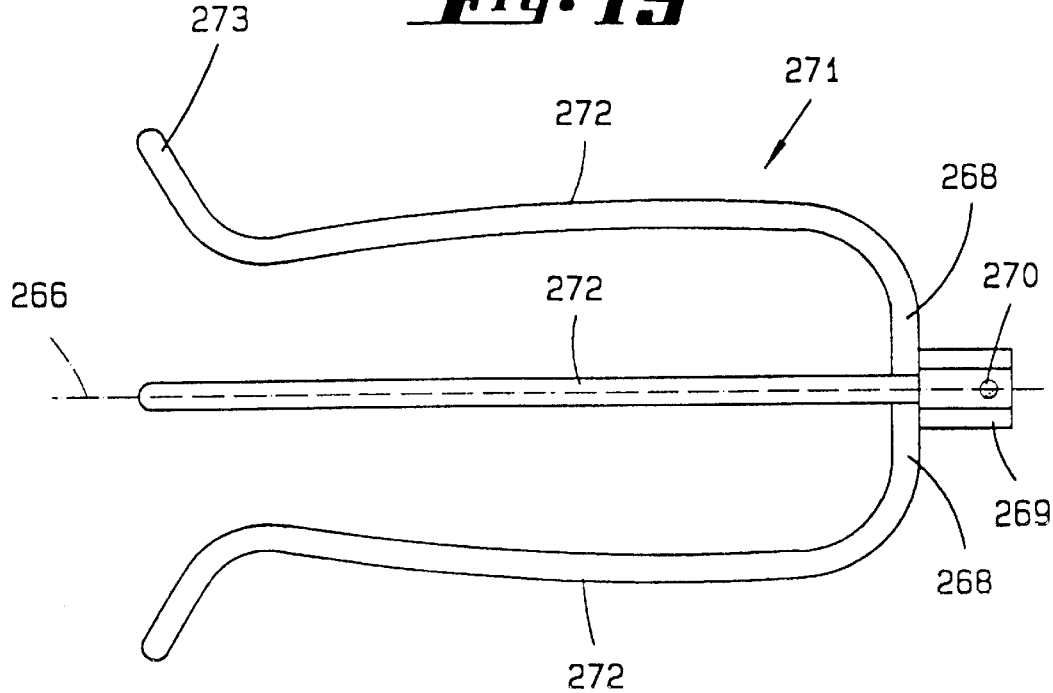

ARRANGEMENT OF A PLURALITY OF FOOD-PREPARATION APPARATUSES

RELATED APPLICATION

This a continuation of my application Ser. No. 08/776,304 filed May 19, 1997 under 35 USC 120 now abandoned.

BACKGROUND OF THE INVENTION

The present invention relates to an arrangement of a plurality of apparatuses for the preparation of food, for example steamers, boilers, broilers, roasters, or microwave units, each of which can be set to a particular cooking time.

Every large kitchen or restaurant is equipped with an arrangement of apparatuses for the preparation of food. It is furthermore known that hotels and restaurants strive to offer their guests a selection of a large number of different dishes. These dishes differ with respect to the combination of food elements, such as pieces of meat, poultry, fish and side dishes such as vegetables, rice, potatoes, etc. It is important here that the items of food require different periods of preparation. On the other hand, the food must not be overcooked, i.e. once done, the food should not be cooked further or kept warm for too long. Valuable flavor and nutrient elements are lost thereby.

SUMMARY OF THE INVENTION

Against this background, it is an object of the present invention concerned with the technical problem providing an arrangement of a plurality of food preparation apparatuses for the preparation of a complete dish consisting of several different foods.

In accordance with the invention preparation time of each apparatus can be controlled and a switching center is provided, which is connected to each apparatus by a control line, the switching center having a control unit for automatically establishing different preparation times for the foods to be prepared in the individual apparatuses. In accordance with the invention, a common end point in time is established with regard to the preparation time and the operating time of the apparatus of the arrangement. Since it is known what type of food is to be prepared in each one of the apparatuses, the specific preparation time can also be set in advance, possibly in accordance with the quantity, and the control unit can calculate what treatment time is necessary individually for the different foods. The start of the periods of preparation can also be staggered so as to see to it that all the foods are ready at the same end point in time. Therefore, the start of the cooking time in the apparatus in question can also be controlled. As a further advantageous embodiment, the control center may have a microprocessor. It is also preferable that an apparatus of this arrangement be connected to a storage container. This storage container holds a quantity of the food which is to be prepared in the apparatus in question, for instance a quantity of potatoes or vegetables, rice, etc. In this connection, it is also particularly preferred that the storage container be a refrigerated container. Foods delivered in frozen condition are kept frozen in the storage container until a given amount of the food in question has been fed from the storage container into the cooking apparatus. The cooking time is then also established so as first to defrost the food. Since the delivery from the storage container into the cooking apparatuses can also be controlled from the control center, the temperature of the foods fed is also always known relatively accurately so that the cooking time can also be pre-established relatively precisely with respect to this also. In principle, the actual temperature of the food can also be fed back to the control unit via a temperature sensor in the cooking apparatus. In view of the development described above, a temperature sensor and such a feedback is not, however, absolutely necessary. Furthermore, it is also preferred in this connection that one storage container be connected for loading with several cooking apparatuses or that one cooking apparatus be connected also with several storage containers. The latter, in any event, if the foods in question are "compatible", and therefore there is no impairment of taste or otherwise if different foods are prepared one after the other in the same cooking apparatus. For example, noodles and rice appear suitable for such a manner of procedure.

If only one specific dish is ordered in a restaurant, then the development can be such that only the food in question is entered into the control unit/computer, which then automatically controls the different cooking apparatuses and first of all fills them with the foods of the dish and then sets the individual cooking times so that at a common end point in time (or immediately one after the other) the different items of food reach the desired stage of cooking and can be placed together on one or more plates. The combining of the switching center, which may in particular be a personal computer or microprocessor, with an electronic scale is of particular importance and is preferably provided. In such case, the information with respect to individual foods to be prepared such as, for instance, poultry, can be entered directly via the weighing. Furthermore, the control unit is then advised on basis of previously entered empirical values as to how long a time is necessary for cooking this individual food. Since this, as a rule, will be the food requiring the longest cooking time, the control of the preparation time or the start of the preparation times of the other foods can be established on basis of the predetermined end point in time of this cooking process. Furthermore, this can also be combined with a grill wall consisting of a plurality of grilling apparatuses such as described already in the Applicant's German Utility Model 94 13 628.9. The disclosure of said utility model is herewith included in its entirety in the disclosure of the present application, also for the purpose of including features of said older utility model in claims of the present application. In this respect, the control unit, the personal computer, can be informed continuously with respect to all grilling places or the like and also indicate what grilling place will be free next. In particular, a report as to which grilling place/storage container, etc. must be filled can be given to the control unit. The control unit can also indicate continuously the instantaneous condition of all connected cooking apparatuses (filled, emptied, cooking in process, etc.). The entire system can furthermore be implemented in modular manner for expansion. Of course, there can also be concerned in each case a plurality of identical cooking apparatuses, as described in detail with respect to the grill wall.

The object of the invention is also a method of preparing a dish consisting of several items of food, for example a piece of meat or poultry and a vegetable side dish, one food in each case being prepared in a separate apparatus such as, for instance, a steamer, a boiler, or a microwave unit. In this case, the invention proposes, as method for better preparation of dishes that the apparatuses be so controlled with respect to their treatment time by a central control system that all of the items of food are fully cooked at practically the same moment. The preparation time can preferably be program-controlled. In the development in which each of the apparatuses is connected with a storage container, it is also proposed that a centrally controlled refilling of an apparatus be effected.

In case of the preparation of poultry as part of a dish, particularly by grilling, the invention prefers a grilling apparatus having a grill holder which is rotatable around a horizontal grilling axis for receiving a grilled item, particularly poultry, and having a heating surface located above the grilling axis, the heating surface being arranged coaxial to the grilling axis. In this way, the grilled item placed on the rotatable grill holder is always at the same distance within the heating region from the heating surface and is therefore uniformly and intensely heated. According to the invention, the heating surface consists of individual, inductively heated heating elements the heating power which can be individually controlled, for which purpose the heating elements are provided for example with temperature sensors. Thus, a different heating power can be caused to act depending on the food being grilled or else on the desired time of preparation, and the danger of the grilled item being burned as a result of too high a heating power is definitely avoided. It is preferably furthermore provided that the heating elements be developed as bar heating elements, that the bar heating elements extend parallel to the grilling axis, and that the bar heating elements be arranged on a surrounding surface around the grilling axis, it being preferred that each bar heating element be fixed at a first end and that a second end of the bar heating element be angled towards the grilling axis. By the use of bar heating elements there is obtained, without expense, a heating surface coaxial to the grilling axis which is free of costly three-dimensional bends, as would be necessary for instance in the case of a heating coil. The angled free ends of the bar heating elements permit a sufficient and advantageous cooking of for instance the breast of poultry which is placed accordingly on the grill holder.

It has been found that five heating bars, preferably distributed over an arc having an open angle of 180° above the grilling axis are sufficient to provide a uniform heating surface.

As an alternative, it is provided that each heating element be U-shaped with two legs extending from a cross piece, that each heating element be held on its two leg ends and that the free end region having the cross piece be angled towards the grilling axis. Preferably, three U-shaped heating elements, distributed over an arc having an open angle of 180° above the grilling axis form a uniform heating surface. Here also, due to the angled free end region, in particular via the cross piece of the U-shaped control unit element which lies relatively close to the grilling axis, a large heating power is made available for cooking for instance a poultry breast held in corresponding manner on the grill holder. Here also each U-shaped heating element can have its heating power individually controlled and the heating elements themselves or their direct vicinity can be provided with suitable temperature sensors.

In order to increase the heating power, it is furthermore contemplated to arrange a reflector over the heating element. This reflector is preferably of conical shape and has its smallest diameter directed towards the free end of the bar heating elements or the free end regions of the U-shaped heating elements. Furthermore, the reflector is angled there, as a result of which the heating elements lie fully protected behind a protective screen.

The grilling apparatus of the invention has a rear wall, in approximately the center of which there is arranged an adaptor for connecting the grill holder on one side to the grilling axis. The rotatability of the grill holder is assured, for instance, by a rotor situated behind the rear wall over the adapter. This measure makes it possible rapidly to replace completely cooked grilled food by food which is still to be grilled. Furthermore, it is provided in accordance with the invention that the first ends of the bar heating elements or the leg ends are also individually held in the rear wall, so that they can easily be replaced. Furthermore, the reflector is preferably also held on the rear wall.

It can be provided that the rear wall be part of a housing which is closed on all sides which receives a grilling place which is accessible through a front door. The grilling apparatus of the invention is thus shaped in the same manner as previous household grilling apparatuses and can, for instance, replace them. It is furthermore then provided that this grilling place can be evacuated to a low-pressure as compared with the surrounding pressure so as, without impairment of the flavor, to permit a gentle but nevertheless rapid grilling for healthy nutrition.

In order to maintain air circulation, it is furthermore provided that the housing and/or the reflector have a passage opening.

As an alternative to this development, it can be provided in accordance with the invention that a vertical support wall comprises several grilling places, rows of grilling places preferably lying one above the other on the support wall, the grill axes of the individual grilling places of one row being possibly also staggered with respect to the grill axes of the neighboring row. Such an arrangement is advantageous for example for both snack bars and gourmet cooking, since then a rapid throughput of grilled foods is possible. If the grilling time for example for frozen poultry is for instance 30 minutes, then, with eight grilling places, one piece of poultry can be cooked every 3 to 4 minutes.

In particular, for such arrangements of grilling places it can furthermore be provided, in accordance with the invention, that in each case indications of the stage of cooking of the grilled material of each individual grilling place can be given by, for instance, indication of the grilling time which has elapsed, of the remaining grilling time until the completely cooked stage, etc. In a further development of the invention, it can also be provided that a scale is connected to each grilling place, that with respect to each grilling place it can be specified what type of grilled item is concerned, for example poultry, and that a computer automatically calculate from this the cooking time for the grilling place in question and control the cooking process. The computer may also lengthen the cooking process if suddenly fewer customers than anticipated should order the grilled food. This is particularly easy with frozen foods to be grilled. On the other hand, if all the grilling places are occupied, it can be determined via the computer which grilling place will become free next. Such an indication can be brought about for instance by a further item to be grilled being weighed on the scale.

Below the grilling axis, a grease pan can be provided which has side walls which extend up to approximately the height of the reflector. This measure prevents fat from splattering for instance against the side walls of a housing. Furthermore, the grease pan catches the fat dripping off from the item being grilled, whereby the fat can easily be disposed of, for instance also by offering it to a customer. Furthermore, the grease pan can in the manner of a reflector reflect the heat of the heating surface, whereby, in particular, also the defrosting of a frozen grill item can also be accelerated since at this time the grease pan is still not soiled by splattered or dripping fat.

Furthermore a griddle for conventional grilling can also be provided on the grilling axis. The grill holder for receiving the grill item can have the form of a simple spit, one end of the grill holder being designed for connection to the adapter and the opposite free end terminating in a point. However, grill holders having a shape which corresponds substantially to that known from European Patent Application 88 100 835.3 are preferred since they are suitable, in particular, for frozen poultry. There is preferred in this connection a grill holder which has individual struts which extend substantially coaxial to the grilling axis and terminate at the free end in a tip and form on the adapter side an inner space which is held free of grilled items even when the holder is in use. By this measure, not only is the grilled-food holder developed optimally for the receiving of poultry since its shape can be adapted to the abdominal or breast cavity of the poultry, but it also permits a central heating bar which like the others is individually controlled with for instance a temperature sensor as actual-value generator to be arranged on the grilling axis and thus enormously to accelerate a defrosting process, for instance in the case of frozen poultry. Such a heating bar can co-rotate or else be stationary.

In the embodiment of the invention it is furthermore provided that the grill holder have a resting shoulder fastened to the grill holder within the grill item. The item being grilled is held by the grilled-food holder in the manner that the individual struts pass completely through the grilled item, as a result of which free regions are produced on the end side of the grilled item and circulation of air through the grilled item which promotes the grilling process is made possible. As further measure, it is provided that the free end of the grill holder which faces away from the adapter is provided with a counter-holder for fastening the grilled item against the shoulder, as a result of which the grilled item is held dependably both in axial direction and in radial direction.

Another measure provides that a nozzle is associated with the grilling place, that the nozzle is connected to one or more spice containers and that the item being grilled can be sprinkled with spice by means of the nozzle, and/or the atmosphere of the grill area can be enriched by spices. Such an enrichment can also be effected in the manner that the spices can be brought, for instance, into the grilling area also with water in grease pan.

Finally, it is provided that the free end of the grill holder have a connection for a handle by which the grill holder can be inserted into the adapter or removed from it. In particular, when the grill holder is hot, this excludes the possibility of burning oneself and guarantees easy handling without the need for instance of insulated gloves.

So that small items to be grilled can also be grilled with a suitable grill-item holder with which a large grilling capacity is also to be obtained, it is also proposed that the grill holder comprise a preferably circular, co-rotating base plate positioned vertical to the grilling axis, that the adapter be arranged in the center of the base plate, and that the base plate comprises several mounts for replaceable receivers for the grilling axis horizontally, and that the mounts are annularly arranged around the grilling axis at regular angles apart. In advantageous manner, several completely different items to be grilled can thus be cooked simultaneously on a single grill, the replaceable mounts for the grilled items ensuring suitable receivers can be used for completely different grilled items. It is provided that each mount is mounted in the base plate for rotation around its own axis of rotation parallel to the grilling axis and that each mount has a force-transmission element via which each receiver can be rotatably mounted in the base plate around its own axis of rotation by means of a drive. By the independent rotation of each receiver for individual pieces of grilled food assurance is had that these pieces of grilled food are completely uniformly radiated, whereby a uniform grilling process is assured. In a first variant, it can be provided for the drive of this self-rotation that each force-transmission element has a gearwheel which is operatively connected with the gearwheel on the stub shaft. In this connection the gearwheel of the force-transmission element can mesh directly with the gearwheel on the stub shaft, or else further intermediate gearwheels are provided. As an alternative to this, it can be provided that each force-transmission element have a toothed wheel which contacts a tooth and/or ring of teeth not co-rotating with the grill holder in order to produce the rotation by itself of the corresponding receiver. In particular, the toothed wheel can have, in the manner of a impeller wheel, for instance four teeth which strike one after the other against the non-co-rotating teeth and in each case turn the receiver by a certain angle, for instance 90° or 138°, around its axis of rotation. A detent apparatus can for this purpose be provided within the force-transmission element, as a result of which a precise region of rotation for the self-rotation is established by one of the vanes for example striking against a tooth and the receiver itself is held fast upon rotation of the grill holder. A further drive concept provides for each force-transmission element to comprise a gearwheel which, similar to a planetary gearing, is operatively connected with an internally toothed gear rim, the gear rim annularly surrounding the gearwheels. A further preferred drive concept provides that each force-transmission element comprises a gearwheel which cooperates with an externally toothed gear rim, the gear rim being annularly surrounded by the gearwheels. In the alternative embodiments of the drive, further force-transmission elements can also be arranged between the gear rims and the gearwheels. Another drive concept provides that each force transmitting element has a drive wheel, for instance in the manner of a pulley or a sprocket, wheel around which a drive belt travels for instance in the manner of a drive cord or a drive chain, and that the drive belt is driven by a further drive wheel which is independent of the grill holder. A spring-wire rope can be used, for instance as drive cord. In such drives, the stationary drive wheels which are independent of the grill holder are preferably teeth, a ring of teeth or gear rims arranged on a wall, for instance a rear wall of an oven-like grill. It is furthermore provided that the adapter, the toothed wheels, drive wheels and gearwheels of the force-transmission elements and/or all further force-transmission members be arranged on the underside of the base plate, opposite the receivers. This guarantees a drive which is reliable, very robust and protected for example from any splatterings of fat by the base plate itself. A further embodiment of the invention can provide that the adapter, the toothed wheels, the drive wheels together with the revolving drive belt and the gearwheels of the force transmissions and/or further force-transmission members are encapsulated by a cover plate. Depending on the development, corresponding recesses must then be provided for the drive. On the one hand, dirtying is prevented thereby and on the other hand the risk of injury from exposed toothed wheels, drive wheels and their drive belt, gearwheels and/or force-transmission members in expanded condition of the grill holder is practically excluded. In accordance with another feature of the invention, the base plate can be bowl-shaped with feet on its bottom side on which the grill holder can be placed in the expanded condition. This considerably facilitates the handling, since the bowl shape of the base plate catches fat dripping off from the grilled food, etc. so that the work surface is not soiled. In accordance with the invention, the grill holder furthermore has a middle support which extends concentrically to the grilling axis and which is developed in the manner of a spit in order to receive large items to be grilled such as, pheasants, ducks or small turkeys, as well as a roast. The middle support in its development on the grilling axis has a free space to receive a heating bar which is arranged on the stub shaft. This heating bar on the one hand produces an internal heat within the said larger items to be grilled or else creates a second heating surface lying on the grilling axis for the different receivers for individual items to be grilled arranged concentrically to it. In order to assure particularly good efficiency of such a heating bar, it can be provided that the middle support has, arranged in ring shape around the grilling axis, individual struts which extend along the grilling axis and can debouch at a free end into a spit-like tip and which on the adapter side form the free space, which even upon use is maintained free of items to be grilled for the reception, for instance, of the heating bar. The item to be grilled is held on the individual bars of the middle support passed through by the individual struts so that free regions are formed on both sides of the item to be grilled so that circulation of air through the item being grilled is possible so as to support the grilling process. For this, there contribute freely ending individual bars fastened on the base plate between the individual struts spaced uniformly to the grilling axis like the latter, the free ends thereof being bent towards the grilling axis. These individual bars hold the free space free, for instance, of fatty bits of the grilled food. The concentric middle support furthermore comprises a slide piece on which one or more counter holders for the grilled food and/or one or more receivers are displaceably guided. Finally, the middle support can comprise at its free tip a connection for a handle by means of which the grill holder can via the adapter be attached to or removed from the stub shaft. This connection is preferably of the bayonet type so that dependable handling is assured. As receivers for the individual pieces of grilled food a large number of different shapes enter into consideration. One embodiment provides—in candlestick-like manner—a dish with a central mandrel on which the food to be grilled simply placed. For this purpose, the mandrel is developed in such a manner that a food being grilled cannot rotate when placed on it. As an alternative to this, several mandrels can be provided. In particular, for fastening, for instance, poultry legs, a fork-shaped counter-holder can be provided on the slide piece of the middle support, the piece being grilled being held by it by means of two resilient prongs. This counter-holder can be guided displaceably by means of a slide part on the slide piece and locked there. Another receiver serves for the grilling for instance of shish kebab on a spit, the one tip of which is held for instance clamped by a stop inserted in a mount for the food being grilled. The second end of the spit is furthermore preferably rotatably held in a counter-holder which is arranged on the slide piece of the middle support. The counter-holder has an arm which is displaceably guided by means of a slide part on the slide piece and can be locked thereon, it having at least one hole and/or bearing for attachments of receivers corresponding to a rotary mounting. The receiver can also have resilient tongues arranged in ring shape around the axis of rotation and extending substantially parallel to the axis of rotation, the tongues serving to hold the item being grilled. One embodiment of this receiver can furthermore provide that the radial distance between the tongues and the axis of rotation is adjustable. Another preferred embodiment of a receiver provides that it is designed like a basket with lattice walls. Such a receiver is best suited for grilled food such as fruit and vegetables. In particular, such lattice walls can be designed so as to be adapted three-dimensionally to the food to be grilled. Furthermore, the lattice walls in this connection preferably surround a grilled-food space and this grilled-food space is accessible through an opening in a part of the lattice wall. It is provided that the grilled-food space be of rotational symmetry to the axis of rotation, and that the lattice walls be in two parts, each surrounding about one half of the grilled-food space and being swingable about a hinge. The lattice wall parts are in this connection kept closed by the force of a spring or a bolt. For easy handling, the individual receivers, which are rotatably mounted only on one side of the mount have at their other end preferably a connection for a handle by means of which the receiver can be inserted into the mount and removed from it. The receiver can be so shaped that it is held in operation by a counter-holder on the slide piece of the middle support. Thus, a single counter-holder developed in disk shape can serve as counter-holder for several receivers. This counter-holder can be adapted to be locked on the slide piece, or the counter-holder can be supported by a spring against a shoulder fastened to the middle support. This shoulder can be part of a cap which is placed on the tip of the middle support and is locked there, for instance, by a bayonet lock. The other side of the cap is preferably developed as receiver for the hand tool. Preferably, in the same manner, a counter-holder is provided for grilled food which is held by the middle support itself. Such a counter-holder is developed in the manner that resilient legs are spread apart by a slider part which is guided on the slide piece of the middle support and rest against the grilled food, holding it fast .

BRIEF DESCRIPTION OF THE DRAWINGS

FIG. 1 is a front view of a first embodiment of a grilling place arranged in a housing;

FIG. 2 is a cross section along the line II—II of FIG. 1;

FIG. 3 is a front view of a second embodiment of a grilling place arranged in a housing;

FIG. 4 is a cross section along the line IV—IV of FIG. 3;

FIG. 5 is a grill holder in accordance with the invention;

FIG. 6 is a handle for the handling of the grill holder of FIG. 3;

FIG. 7 is a longitudinal section through the grill holder;

FIG. 8 is a top view of the grill holder along the arrow VIII in FIG. 5;

FIG. 16 is a third receiver for grilled items;

FIG. 17 shows a fourth receiver for grilled items;

FIG. 18 shows a fifth receiver for grilled items;

FIG. 19 shows a sixth receiver for grilled items;

DETAILED DESCRIPTION OF THE PREFERRED EMBODIMENTS

Figure 11:
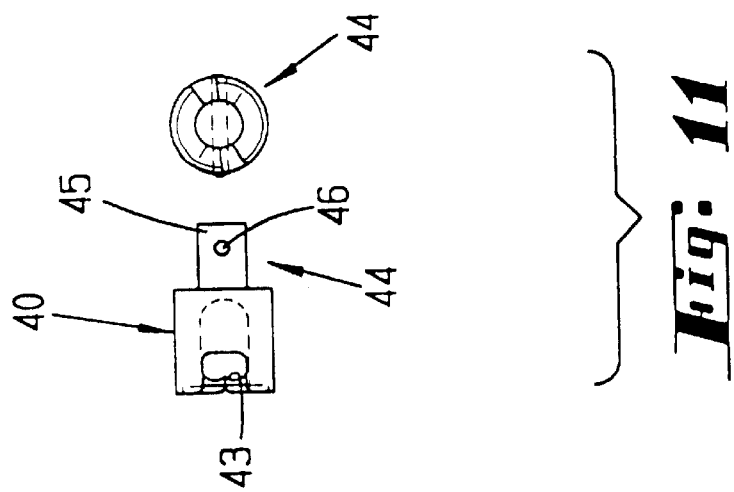
FIGS. 9 through 11 are a counter-holder for fastening the grilled item, shown in its individual parts.

FIG. 1 shows, in front view, a housing 1 which is closed on all sides and contains a grilling place 2 similar to an oven. The grilling place 2 is accessible by a front door 3. Alongside of it, the housing 1 has a switch panel 4 with operating members 5 and indicating members 6 for the grilling place 2.

The grilling 2 having a horizontal grilling axis 7 around which a grill holder 20—merely indicated in FIG. 1—preferably in accordance with FIG. 3, is rotatable to receive a grill item 29, has a heating surface 8 lying above said grilling axis 7 and developed and arranged coaxial to the grilling axis 7. The heating surface 8 is formed of individual, preferably inductively heated heating elements 9 which are developed as bar heating elements and can be controlled individually with respect to their heating power by means of the operating elements 5. For this purpose, a temperature sensor, not shown in detail, is provided in each case as actual-value indicator of the temperature. The five heating bars 9 provided extend parallel to the grilling axis 7 and lie on a surrounding surface 10 coaxial to the grilling axis 7, the heating surface 8 which is thus formed covering, in accordance with the view in FIG. 1, an arc having an open angle of 180°.

The bar heating elements 9 are in each case held on a first end 11 in a rear wall 12 of the grilling place 2. The free second ends 13 of the heating bars 9 are bent towards the grilling axis 7; see also FIG. 2.

Over the heating surface 8 there is arranged a reflector 14 which is slightly conical and which is fastened in the region of its largest diameter also to the rear wall 12 of the grilling place 2. In front of the free ends 13 of the heating elements 9 the reflector has a forwardly bent protective screen 15 so that the heating surface 10 can radiate only onto the food being grilled and the heating elements 9 are thus protected, for instance, from contact with one's hand.

Below the grilling axis 7, there is a grease pan 16 the side walls 17 of which extend to about the height of the reflector 14. This grease pan 16 is arranged on a griddle for conventional grilling provided there.

A closable passage opening 18 assures air circulation for the grilling place 2. Furthermore, such a closed grilling place 2 is also excellently suitable for evacuation and thus for low-pressure cooking.

In particular, it can furthermore be noted from FIG. 2 that a nozzle 60 having nozzle openings 61 is associated with the grilling place 2. This nozzle 60—not shown here—is connected with one or more spice containers. If this spice container can be acted on, for instance, by compressed air, then a food being grilled on the grill holder 20 can be sprayed with spice emerging from the nozzle openings. Particularly in the case of a closed grilling place in accordance with FIGS. 1 and 2, it is, however, also generally sufficient to saturate the atmosphere of the grill space 2 sufficiently with spice in order to cook the grilled item to taste. To be sure, this nozzle can also be connected with the grease pan 16 so that spices having for instance a liquid base can be sprayed there.

The grilling place 65 of FIGS. 3 and 4 is substantially similar to the grilling place 2 and, accordingly, the same position numerals have been extensively used. The main difference resides in the development of the heating elements 66. They are substantially U-shaped with two legs 68, 69 extending from a cross piece 67. The free leg ends 70 are held in the rear wall 12. The free end regions 71 with the cross piece 67 are angled towards the grilling axis 7. As shown, three U-shaped heating elements 66 form the heating surface 8 here.

Each of the rear walls 12 has approximately at its center an adapter 19 for the reception on one side of a grill holder 20 in accordance with FIG. 5 on the grilling axis 7. Such a receiver can be developed form-locked and forcelocked. The decisive factor is that the movement of rotation of the adapter 19 which is driven by a motor is transmitted also to the grill holder 20 of FIG. 3. The grill holder 20 is developed essentially in the manner of a spit and one end 21 is developed for connection to the adapter 19 in the manner that the grill holder 20 has a bore hole 22 by which the grill holder 20 can be pushed onto the adapter 19. An extension 23, inserted into a corresponding recess 24 in the adapter 19, provides assurance that the grill holder 20 is carried along upon a rotating movement. A polygonal development of the bore hole and/or the adapter can also be provided.

The free end 25 of the grill holder 20 terminates in a tip 26 by which it can penetrate for example through poultry, see FIG. 7. The grill holder 20 has individual struts 27 which extend coaxially to the grilling axis 7 and are held on the adapter side in ring shape on a foot 28 by, for instance, welding. Towards the free end 25, these individual struts extend approximately parallel or coaxial to the grilling axis 7 thereby forming on the adapter side an inner space 29 which is held free of items being grilled even upon use; see FIG. 5. Towards the free end 25 of the grill holder 20, the individual struts 27 are combined to form the tip 26 by which the grill item 56, for example a poultry part, can be penetrated. On passage from the inner space 29 which is kept free of grilled items to the tip 26, the individual struts 27 form a shoulder 55 which holds the grilled food 56 from the inside. The development of the inner space 29 which is free of grilled food makes it possible to arrange on the grilling axis 7 another heating part 30 which can rotate together with the adapter 19 or else can remain fixed.

Free-ending bars 51 are furthermore welded for instance on the foot 28, they having bends 52 at their free end. These bars 51 serve to protect the middle heater bar 30 from, for instance, fatty bits hanging from the grilled food 56.

The grill holder 20 furthermore comprises on the adapter side a stop 31 fixed on the grill holder, it having the form of a plate on which the grilled food 56 comes to rest at the latest upon the pushing over of the grill holder 20 via the tip 26. On the side 32 of the plate 31 facing away from the grilled food, feet 33 are arranged so that the grill holder, standing vertically on the feet 33, can be provided with the grilled food 56.

Figure 10:
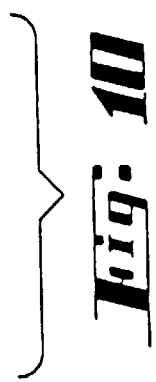
Figure 9:
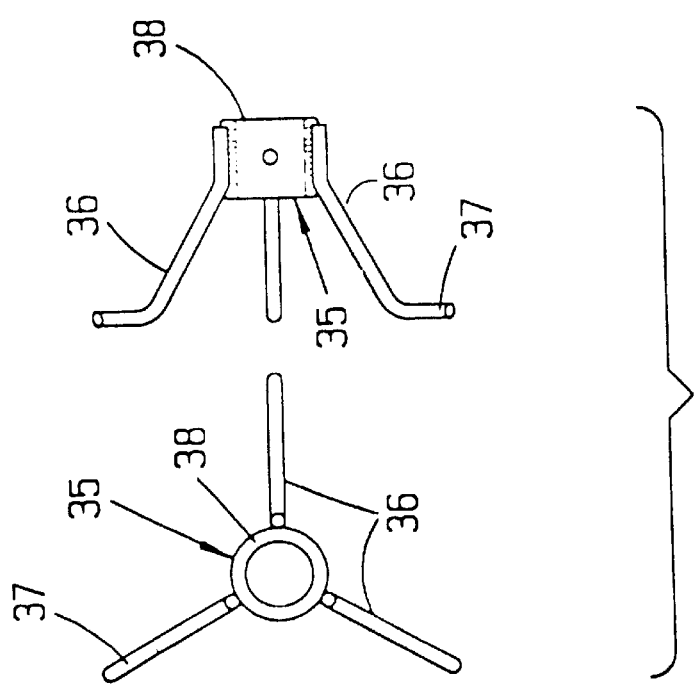

On the grill holder 20, the grilled food 56 is clamped between the shoulder 55 and a counter-holder 34, the individual parts of which are again shown in FIGS. 9 to 11.

Such a clamping has the advantage that at both ends of the grilled food 56, free regions 57, 58 are formed by the individual struts 27 and the bars 51, through which air can circulate through the grilled food 56.

The counter-holder 34 comprises a slide piece 35 which is displaceably guided on the free end 25 of the grill holder 20, and from which legs 36 diverge to rest against and hold fast the grilled food 56. The number and development of the legs 36 is practically any desired; fixed mandrels can also be provided, for instance, on the slide piece 35. The embodiment shown here with legs 36, having end bends 37, however, has the advantage that the grilled food 56 is held resiliently without damage by the widening of the legs 36, as a result of which a change in the grilled food 29 by the cooking process has no effect on the holding fast. This resilient holding is further supported by the fact that a compression spring 39 in accordance with FIG. 10 is clamped between an annular shoulder 38 on the slide piece 35 and an abutment fastened to the grill holder. In accordance with the embodiment shown, this abutment is developed as cap 40 in accordance with FIG. 11. The cap 40 covers the tip 26 of the grill holder 20 and is dependably held on it by a bayonet lock 41, for which purpose the grill holder 20 has one or more pins 42 and the cap 40 has corresponding recesses 43 for the attachment and locking.

The counter-holding is possible as alternative in a single-piece embodiment in which holding mandrel, holding legs, etc. are arranged on a carrier which can be fastened on the grill holder in self-resilient manner and/or axially displaceable against the force of a spring in the manner described above.

The cap 41 furthermore has a connection 44 in the form of an extension 45 of rectangular cross section extending along the grilling axis 7, which extension bears bolts 46 transverse thereto. A handle 47 as shown in FIG. 6 has a receiver 48 which corresponds to said connection 44 and in which the grill holder is held fixed against rotation by the rectangular development in cross section of the extension 45 and fixed in axial position by locking of the bolts 46 in recesses 49. For further simplification of the handling, there is also provided on the handle 47 a hook 50 which is bent towards the receiver 48 by 180° and is open towards that side, for instance in order to receive hot parts.

Figure 12:
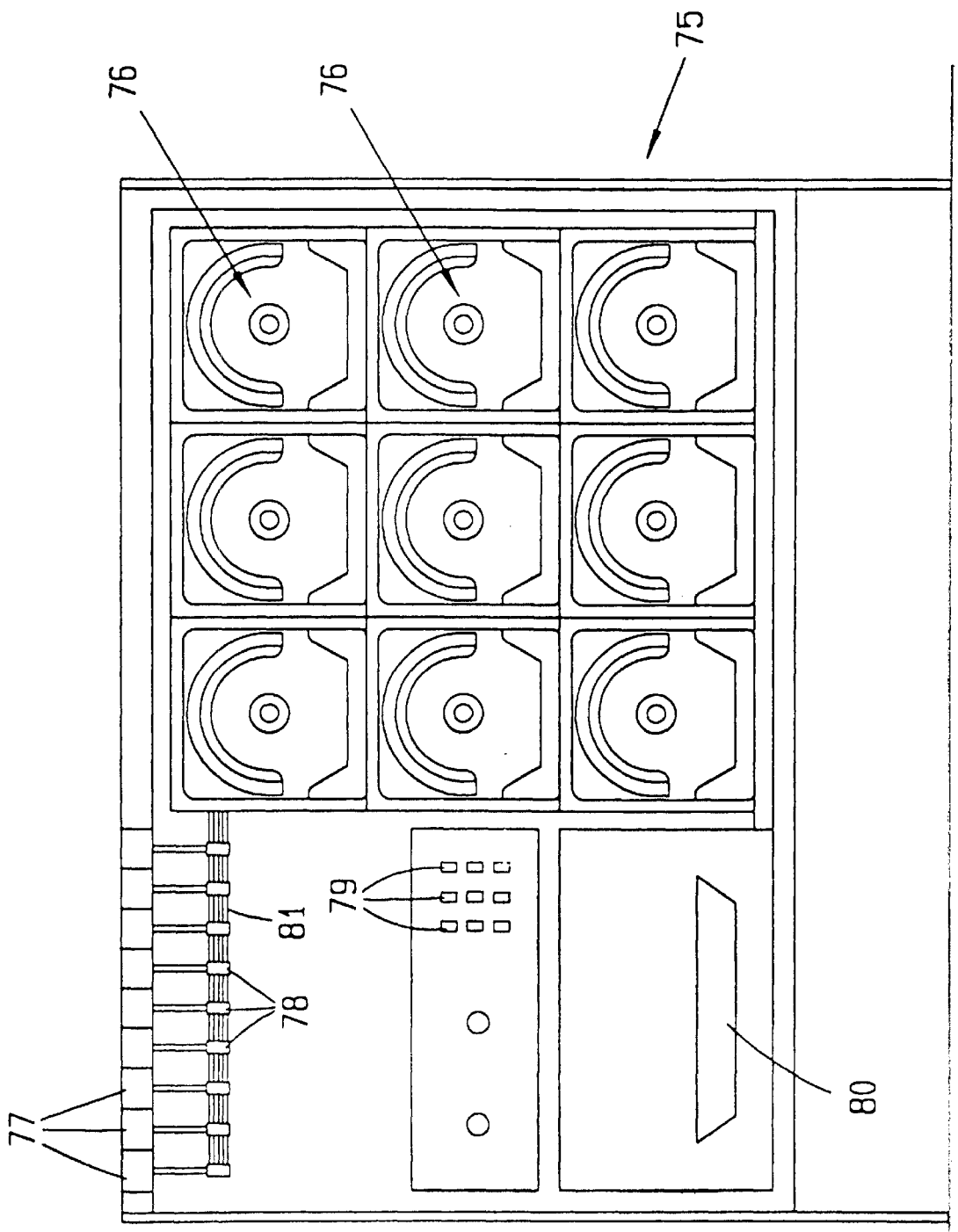
FIG. 12 is a top view of a grill wall having a plurality of grilling places.

FIG. 12, finally, shows a grill wall 75 with a total of nine grilling places 76, shown in simplified form. These grilling places 76 can be provided separately from each other or open with, for instance, a common exhaust hood. Furthermore, the individual rows of grilling places 76 can for instance be staggered with respect to each other. First of all, here again, a nozzle which is connected via a conduit 81 in each case to spice containers 77 is associated with each grilling place 76. By means of valves 78, a desired spice from a spice container 77 can be associated with each grilling place 76 via a control the operating elements 79 of which are merely indicated. Furthermore, a scale 80 is connected to each grilling place 76. After measuring the weight of a food to be grilled, a computer can calculate the cooking time from the weight and, after entry of the type of food to be grilled and then after selection of a specific grilling place 76, automatically control the grilling process, also for instance causing the lengthening of the grilling process in the event, for instance, of a reduction in the stream of guests.

Figure 13:
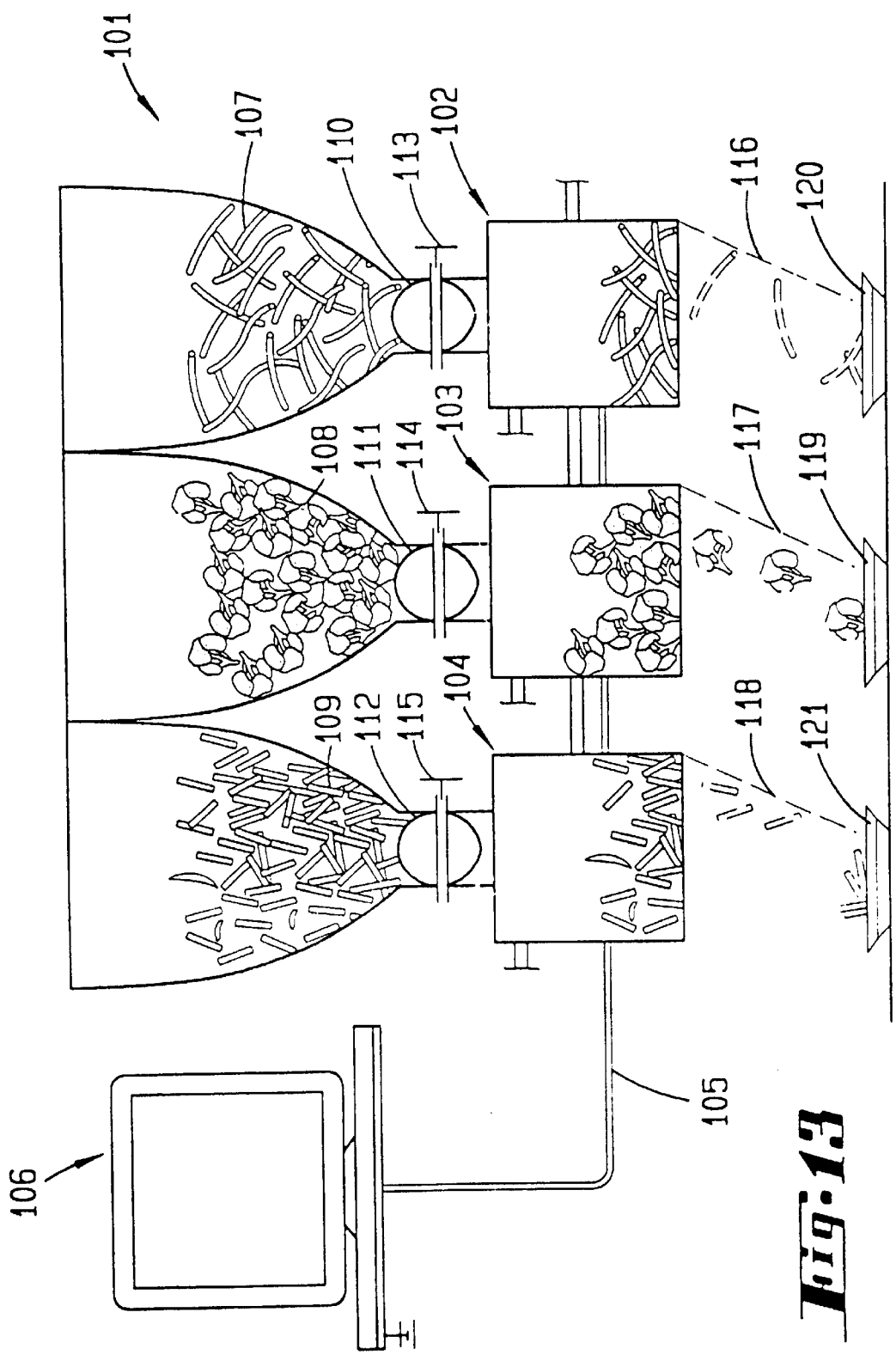
FIG. 13 is a diagrammatic view of three food preparation apparatuses with associated storage containers and a central control unit.

With respect to the basic concept of the invention of providing an arrangement of a plurality of food preparation apparatuses with which a single end time for the cooking is reached, reference is had in particular to FIG. 13.

In FIG. 13 there is shown and described an arrangement 101 of a plurality of food preparation apparatuses 102, 103, 104. They may consist, for instance, of a steamer 104, a boiler 103, and a microwave unit 102.

The apparatuses 102, 103 and 104 are connected by a control line 104 to a control unit, here in the form of a personal computer 106.

Above each apparatus 102, 103, 104 there is a storage container 107, 108 and 109. Via a feed channel 110, 111, 112, which can in each case be blocked by a shut-off member 113, 114 and 115, shown diagrammatically, the storage containers 107, 108 and 109 are connected to the corresponding apparatus 102, 103 and 104. While a vegetable, for instance, is present in the storage container 107, potatoes are present in the storage container 108 and rice in the storage container 109. In addition, other cooking apparatuses can also be provided and be connected to the control line 105, in which, in particular, a meat or fish component or a poultry component of the dish to be produced is prepared. With reference to such an apparatus for the preparation of poultry, reference is had, in particular, to German Utility Model Application 94 13 628.9. The content of that utility model application is herewith incorporated in its entirety in the disclosure of the present application, also for the purpose of including features of said incorporated utility model application in claims of the present application.

The individual apparatuses 102, 103 and 104 have, on their bottom, flaps 116, 117 and 118 which have been merely diagrammatically indicated. In addition, the finished cooled items from the cooking apparatuses 102, 103 and 104—not shown in detail in this drawing—are also coupled by joined discharge paths in such a manner that the elements of the dish then come onto a plate 119.

Since the preparation times for the individual foods, in this case rice, potatoes and vegetables, differ, the feeding into a cooking apparatus 102, 103 and 104 and the following cooking time are so controlled that the food are completely cooked practically at the same moment and can be placed on a plate 119, 120 or 121.

This can also be controlled in the manner that the foods become fully cooked one after the other so that one can move the plate from one preparation apparatus 102, 103 and 104 to the next.

Figure 14:
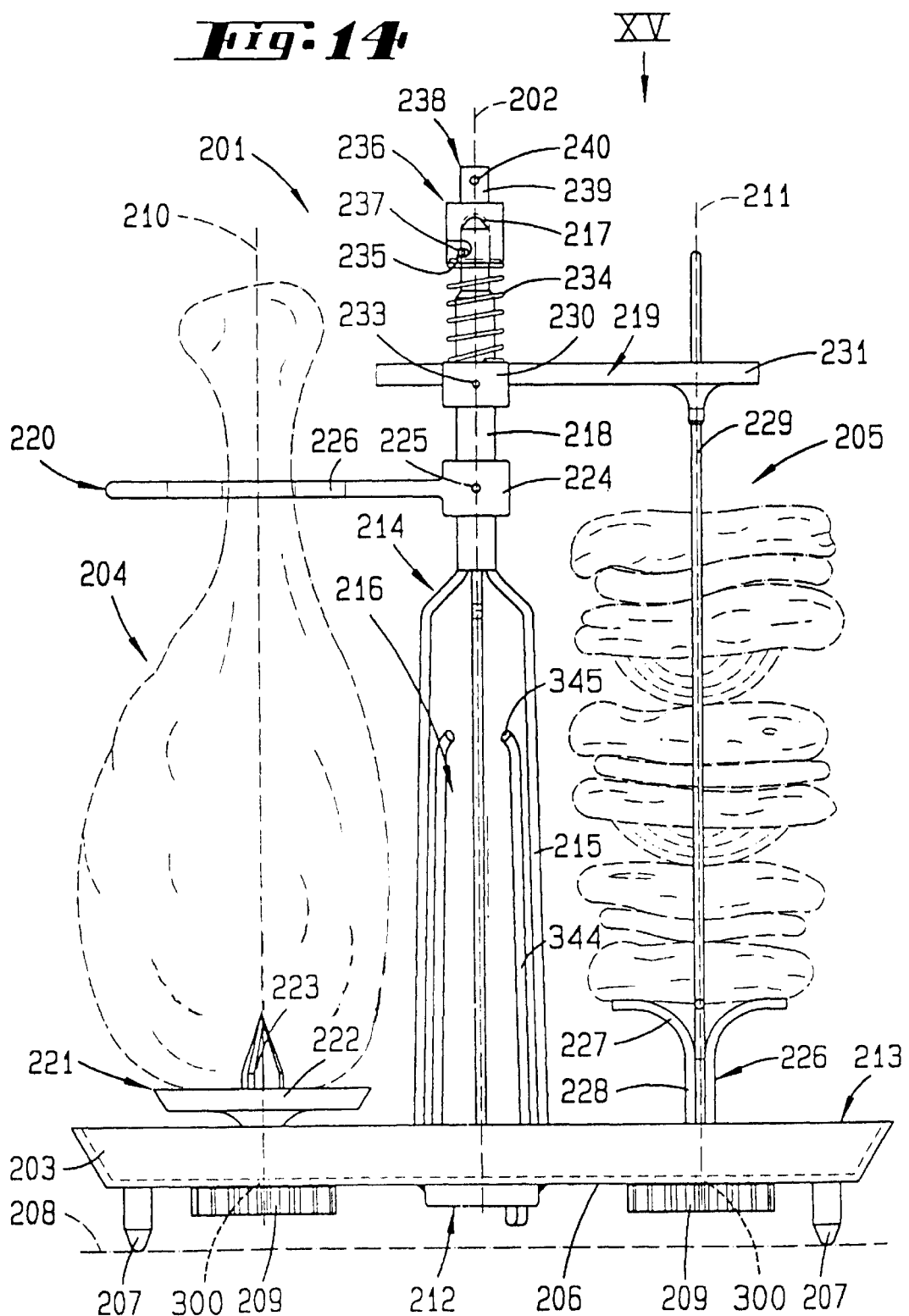
FIG. 14 is a grill holder in accordance with the invention, with two different receivers for grilled items.

FIG. 14 shows a grill holder 201 having a base plate which extends perpendicular to the grilling axis 202 and on which a receiver 204 for, for instance, a leg of meat and a receiver 205 for, for instance, a shish kebab spit are arranged. For easier viewing, only two receiver 204, 205 have been shown here; preferably between three and five receivers which are arranged at regular angular distances apart in ring shape around the grilling axis 202 are present. By the development of the mounts 300, the receivers can be replaced as desired, including for instance by embodiments in accordance with FIGS. 15 to 20. On the underside 206 of the base plate 203 there are arranged feet 207 by which the grill holder 201 can be placed with vertical grilling axis 202 on a work surface 208, for example. The grilling axis 202 can also be vertical in operation or else preferably horizontal. By the feet on the bottom side 206 the latter is spaced from the work surface 208 and therefore parts of force-transmission elements can easily be arranged on the bottom, in this case gearwheels 209, by which the receivers can be placed by a drive (not shown) in rotation of their own around their axes of rotation 10, 11. Furthermore, on the bottom 206 of the base plate 203 there is an adapter 212 for the attachment and locking of a driven stub shaft.

On its upper side 213, the bowl-shaped base plate 203 has a middle support 214 developed generally in the form of a spit. The middle support 214 consists essentially of individual struts 215 extending parallel to the grilling axis 202 and arranged coaxial to said axis, the struts developing towards the adaptor 212 a free space 216 to receive, for instance, a central heating bar. At their other end, the individual struts terminate in a tip 17, in which connection between the tip 217 and the free space 216, a sliding piece 218 ceivers (sic) 204, 205 are held and guided. Furthermore, between the individual struts 215 there are arranged freely terminating bars 344 which are provided at their free end with bends 345 towards the grilling axis 202.

The receiver 204 consists of a plate-like stop 221 inserted in a mount, the plate 222 having centrally a mandrel 223 for the placing on of a food to be grilled. The mandrel 223 consists of intersecting pointed surfaces whereby a turning of the grilled food on the mandrel is effectively prevented. A counter-holder 20 for this grilled food is displaceable by means of a slide part 224 on the slide piece 218 of the middle support 212 and thus guided in a manner adaptable to grilled food and can be fixed on the slide piece 218 by means, for instance, of a screw 225 (not shown in detail). From the slide part 224, there extend in fork-like manner two prongs 226—see with respect to this also FIG. 15—which resiliently hold the grilled food. In this connection, the spring force is so dimensioned that the grilled food can still turn in this resiliently held position. For easy handling of the counter-holder 220, the two prongs 226 are angled upward at their free end, whereby the counter-holder 26 can be spread slightly.

The receiver 205 for, for instance, a shish kebab spit, has a stop 226 which is inserted in a further mount 300 of the base plate 206. This stop 226 consists essentially of a bundle 228 of individual bars 227 which, bent out towards the grilled food, hold the grilled food fast. In the center, the bundle 228 of individual bars receives the actual shish kebab spit 229 which passes through the food being grilled. At the end, opposite the mount, the shish kebab spit 229 is rotatably mounted in the counter-holder 219. This counter-holder also has a slide part 230 which is displaceable on the slide piece 218 of the middle support 214. From the slide bar 230 there extends an arm 231 which is passed through 221 by a bore hole 232 for receiving the handle-side end of the shish kebab spit 229; see in this connection also FIG. 15. The slide part 230 can also be fixed by a screw 233 (not shown in detail) which is preferred, particularly, in the case of receivers 205 which are used only individually.

Figure 15:
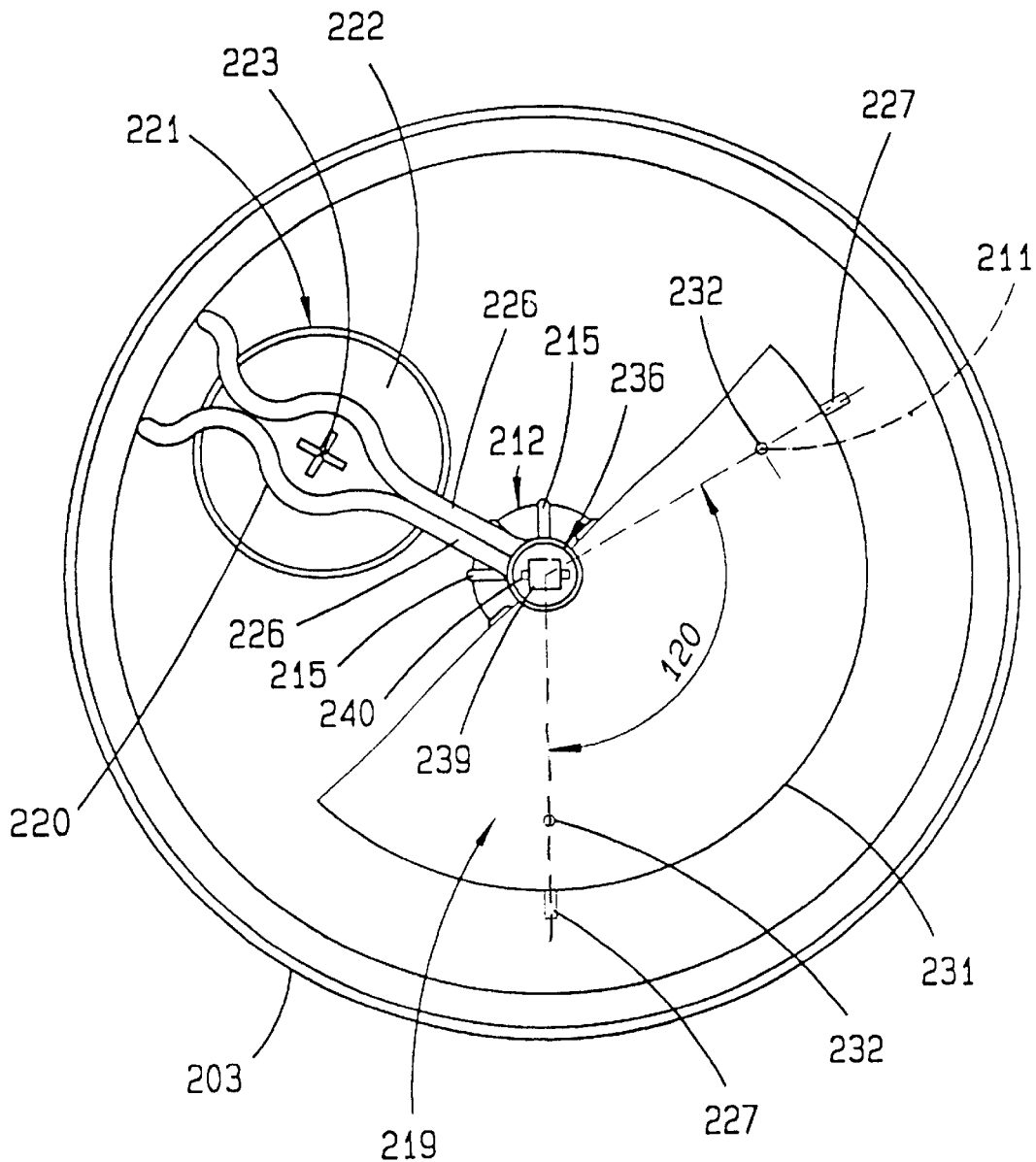
FIG. 15 is a top view of a grill holder according to FIG. 14.

In particular, in the case of uniformly long receivers with the same development for mounting in a counter-holder, the arm 231 is preferably disk-shaped, as indicated in FIG. 15, with in each case holes/bearings 232 for the corresponding receivers. Furthermore, the arm 231 is held resiliently against the receivers via the slide part 230 by the force of a spring 234 which rests on a shoulder 235 which is secured on the middle support.

The shoulder 235 is formed by a cap 236 which is placed on the tip 217 of the middle support 214 and locked there by means of a bayonet lock 237. This cap, furthermore, has a connection 238 in the form of an extension 239 of rectangular cross section extending along the grilling axis 202, which bears bolts 240 transverse thereto. A handle 241, shown in FIG. 22, has a receiver 242 which corresponds to this connection 238 and in which the grill holder is held fixed against rotation by the development of the extension 239 with a rectangular cross section and by the locking of the bolts 240 in the recess 243 of the receiver 242 is held fixed in axial direction on the handle 241. For further ease in handling, there is also provided on the handle 241 a hook 243 which is bent 180° towards the receiver 242 and is open to that side.

FIG. 16 shows another embodiment of a receiver 250 which is developed in basket-like manner with lattice walls 251. The lattice walls 251 surround a grilled-food space 252 which is accessible by opening a part 253 of the lattice wall. The grilled-food space 252 is developed with rotational symmetry to the axis of rotation 254 and two lattice-wall parts 253, 255 surround the grilled-food space 252. The lattice-wall part 253 is swingable around a hinge 256 against the force of a spring which holds the lattice-wall part 253 in the closed position shown. In addition, or as alternative, FIG. 15 shows how, by means of a cap 261 placed on two end pieces 257, 258 of a frame 259, 260 spanning the lattice wall, the lattice-wall parts 253 and 255 are interlocked. This cap 261 can also have an extension 262 as counterpart of the receiver 242 of the handle 241. The opposite side of the receiver 250 has a hexagon 263 for insertion into a mount 300 in accordance with FIG. 24. In known manner—see FIG. 25—this simple insertion connection is secured by means of a spring-mounted ball 264.

Figure 24:
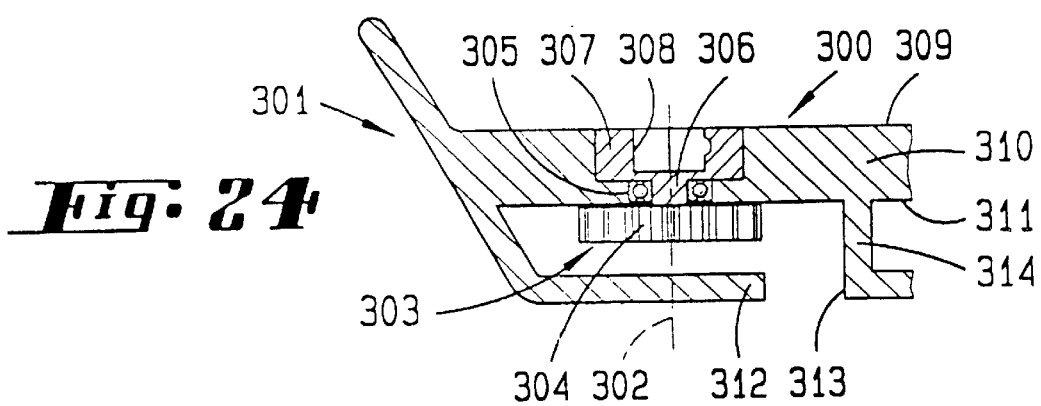
FIG. 24 is a cross section through a base plate in the region of a mount for a receiver.

The receiver 265 shown in FIG. 17 has resilient tongues 267 arranged eccentric to the axis of rotation 266 and extending substantially parallel to the axis of rotation 266, a grilled food being held by said tongues. On the grilledfood receiving side the tongues 267 are bent towards the axis of rotation 266 but leave a passageway free. On the mount side, the tongues 267 have sections 268 perpendicular to the grilling axis 266 and form so-to-speak a "bottom" as abutment for a grill material. Centrally there is arranged there again at the point of intersection of the sections 268 a hexagon 269 with securing ball 270 for insertion into a mount, as shown in FIG. 24.

It can be provided that the radial distance between the tongues and the axis of rotation can be adjusted. This, for instance, in the manner that the straight sections are made tubular, the tongues being inserted displaceably in them.

The embodiment shown in FIG. 18, concerns a simple meat spit 244 of, for instance, round shape which terminates at the end in a hexagon 245 with securing ball 246 for reception in a mount 300. The meat spit 244 can have one or several rows of mandrels or barbs 247 by which even larger pieces of meat are reliably held. On the tip 248 of the meat spit 244, a cap 236 according to FIG. 14, with an attachment 238 for a handle 241 is again locked for easy handling by means of a bayonet lock 237.

The receiver 271 in accordance with FIG. 19 corresponds on the mount side to the receiver 265, so that corresponding parts bear the same reference numerals. However, in this case the tongues 272 are strongly bent at their free end 273 away from the axis of rotation 266 so that foods to be grilled can be pushed in simple manner into the receiver 271 and, for example, sausages can also be grilled without damaging their skin.

Figure 20:
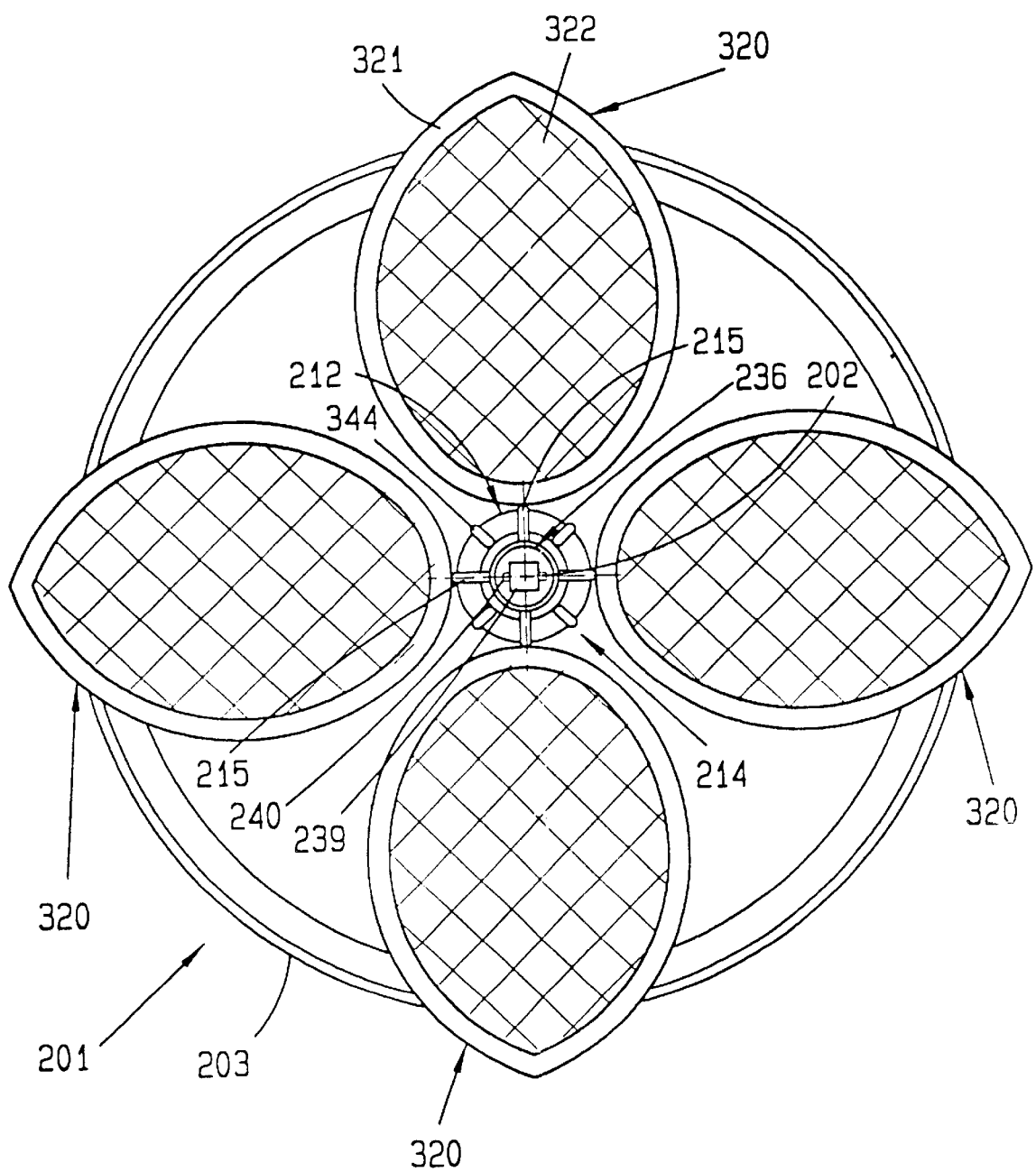
FIG. 20 is a top view along the arrow XV of FIG. 14 of a grill holder with four receivers, for instance for fish.

FIG. 20 shows, in top view, four similar receivers 320 on a grill holder according to FIG. 14. The four receivers 320 are basket-like, shaped for instance in accordance with FIG. 16, in order to hold fish for instance. They consist of frames which hold a lattice 322 spanned. The receivers 320 open towards the front so that loading of the receivers with foods to be grilled, preferably fish, is possible even with the grill holder placed on the adapter. Furthermore, FIG. 20 is a top view of the middle support 214 with the individual struts 215 and the freely ending bars 344.

Figure 21:
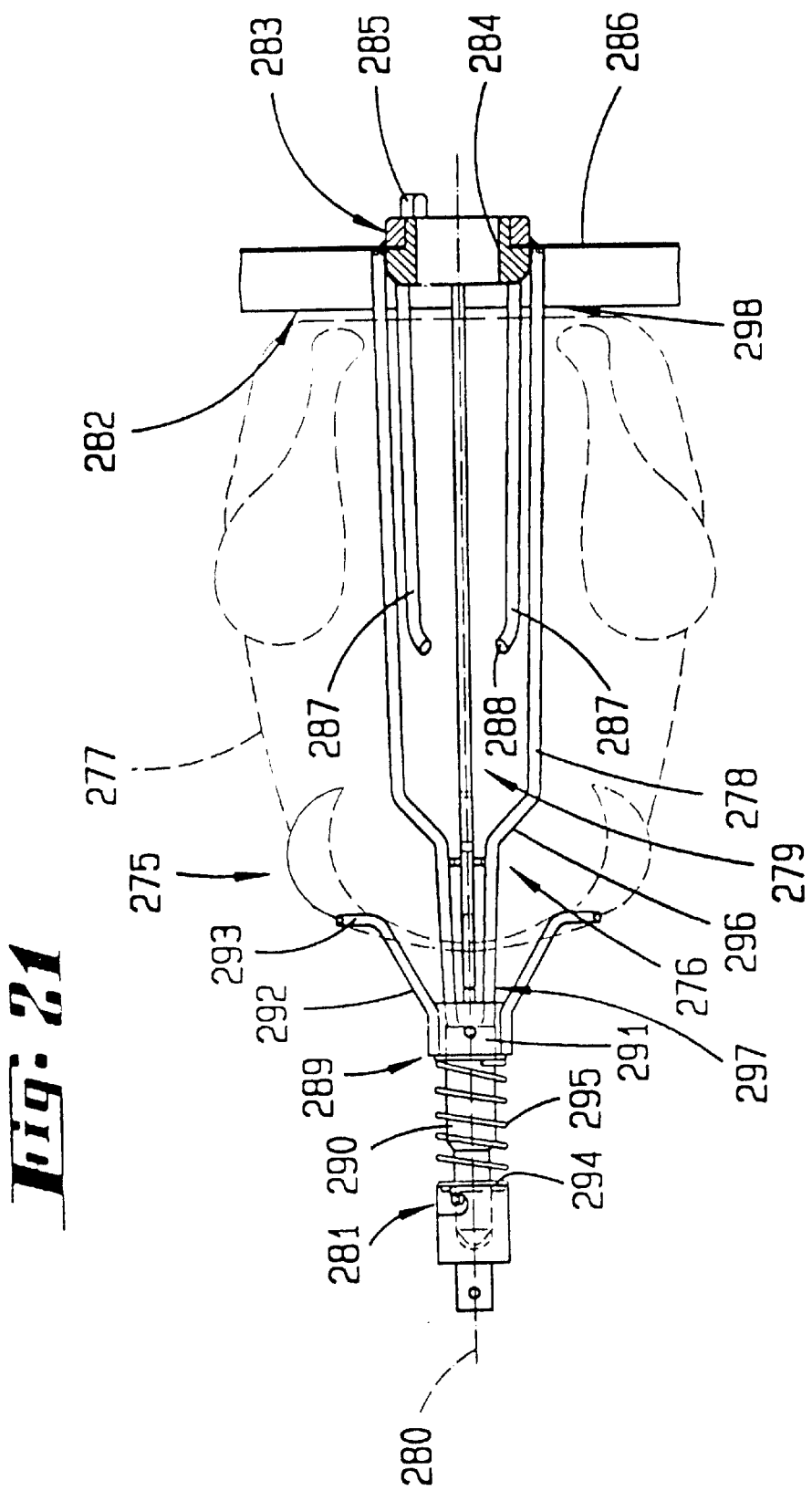
FIG. 21 shows the holding of a large grilled item by a middle support.

On the basis of a grilled-food holder 275, it is explained in FIG. 21 how a middle support 276 can be used, so to speak. as a spit for, in particular, larger poultry such as capons, baby turkeys, etc. as grilled food 277. Corresponding to FIG. 14, the middle support 276 is formed of individual struts 278 which leave a free space 279 for the reception for instance of a heating bar arranged on the grilling axis 280. Corresponding to FIG. 14, the tip of this middle support 276 is also provided with a cap 281. Such a tip makes it possible to penetrate for instance through poultry. The base plate 286 which bears the middle support 276 and which is of plate-shape or bowl shape, has an opening into which a substantially ring-shaped adapter 283 is inserted. By means of a bore hole 284, this adapter can be placed on a stub shaft, an extension 285, introduced into a corresponding recess in the stub shaft, guaranteeing the carrying along of the grill holder upon a rotating movement. The individual struts 278 can be welded in advantageous manner to this annular adapter 283 which passes through the bottom 286 of the base plate 282. Freely ending bars 287 are furthermore welded on the annular adapter 283, they in each case being provided on their free end with bends 288 towards the grilling axis 280. These bars 287 serve, for instance, to protect a middle heating bar from, for instance, bits of fat hanging from the grilled food 277.

The grilled food 277 is held fast between the bottom 286 of the base plate 282 and a counter-holder 289. The counter-holder 289 comprises a slide part 290, which is displaceably guided on a slide piece 290 by which slide part legs 292 are spread apart to rest against the grilled food 277 and hold it fast. The developments of the legs 292 is practically any desired; stationary mandrels can, for instance, also be provided on the slide part 291. The embodiment provided here with legs 292 having end bends 293 has the advantage, however, that the grilled material 277 is resiliently held without damage by the spreading apart of the legs 292, whereby a change in the grilled food 277 by the cooking process has no effect on the holding fast. This resilient holding is further supported by the fact that, between an annular shoulder 294 fastened on the middle support and the slide part 291, a compression spring 295 is clamped. Such a counter-holder 289 can also be made in one piece, for instance together with the cap 281, in which case, for example, holding mandrels, holding legs, etc. can be arranged self-resiliently and/or axially displaceable in the manner described above against the force of a spring on a carrier which can be fastened to the middle piece. The grill item 277 is held by the middle support 276 on its inside by a shoulder 296 in such a manner that at both ends of the grilled food 277 there are free regions 297, 298 of the individual struts 278, so that an unimpeded flow of air through the grilled food is assured. In this connection, the shoulder 296 is preferably adapted to the chest cavity of for instance poultry.

Figure 22:
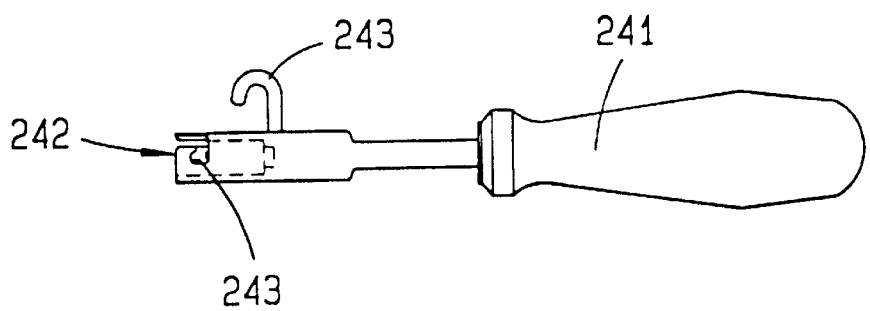
FIG. 22 is a handle for handling the grill holder and receivers.
Figure 23:
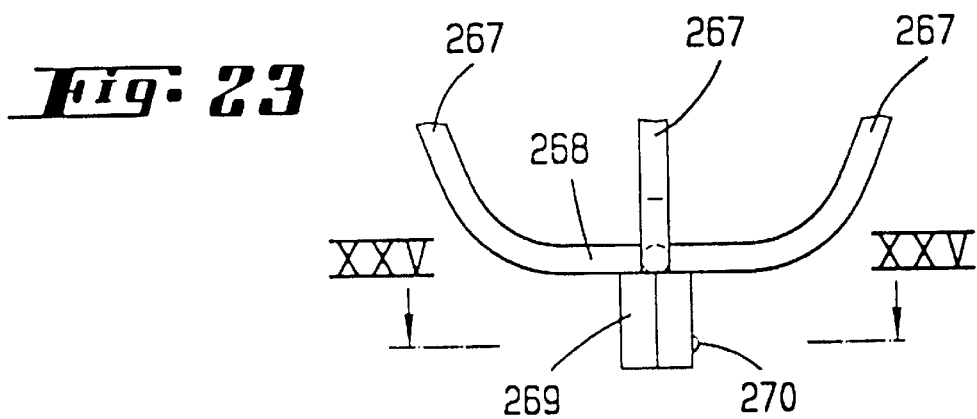
FIG. 23 shows in part the receiver of FIG. 17 in a view along the arrow XXIII of FIG. 17.
Figure 25:
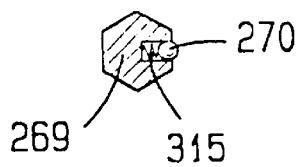
FIG. 25 is a cross section along the line XXV—XXV of FIG. 23.

FIGS. 23 to 25 show the interaction of the hexagon 269, for instance, with the securing ball 270 of the receiver 265 of FIG. 16, again shown in FIG. 23 turned 90° around the axis of rotation 266, having a mount 300 in a base plate 301 in accordance with FIG. 24. Such mounts 300 are arranged in a ring around the grilling axis at regular angular distances apart of, for instance, 120°, see FIG. 14, and are turnable around their axis of rotation 302. For this purpose, each mount 300 has a force-transmitting element 303 via which, by a drive not further shown, the mount 300 can be placed in rotation by itself. The force-transmission element consists essentially of a gearwheel 304 and its shaft 306, which is held here in a ball-bearing 305 and has a widened region 307 with a central recess 308 which is developed in a manner corresponding to the hexagon 369 and the securing ball 370. The surface 309 of the bottom 310 of the base plate 301 ends flush with this widened region 307. The gearwheels 304 of the force-transmission elements 303 which are arranged on the bottom side 311 of the bottom 310 are encapsulated by a cover plate 312. Depending on the drive of the gearwheels 304 by, for instance, a gearwheel mounted on the stub shaft, by a gear rim located on the outside or as provided here lying on the inside, corresponding recesses 313 are to be provided in the cover plate 312 in each case corresponding to the drive. Accordingly, supports 314 must possibly be provided between the lower side 311 of the bottom 310 and the cover plate 312. FIG. 22 shows furthermore in cross section through the hexagon 269 the mounting of the securing ball by means of a spring 315.

Figure 26:
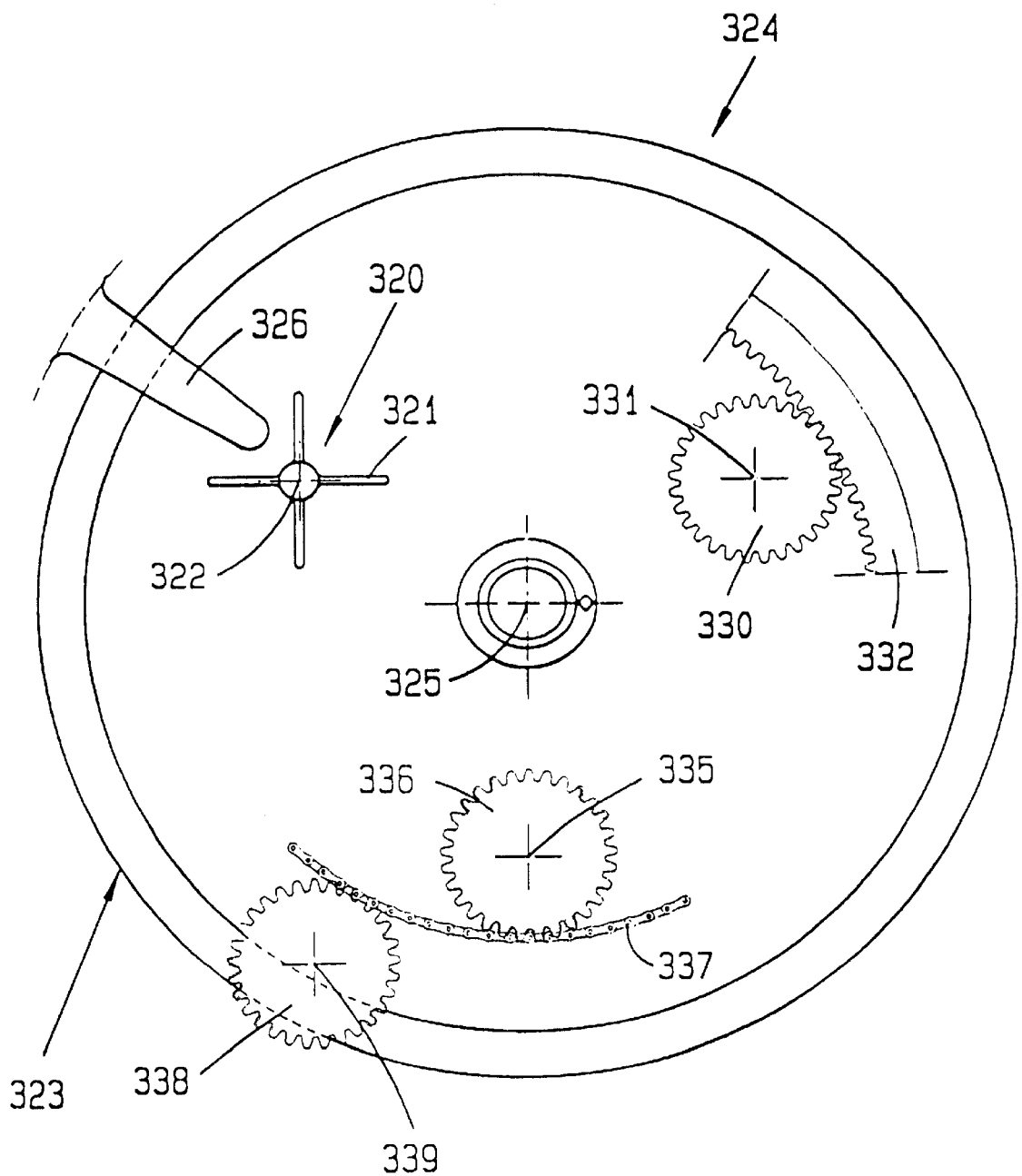
FIG. 26 is a bottom view of a base plate serving to explain different drive concepts.

On basis of FIG. 26, further drive concepts for producing self-rotation of the individual receivers will be explained. A first concept provides that each force-transmission element has a toothed wheel 320 with, for instance, four vane-like teeth 321. The axis of rotation 322 of the wheel 320 coincides with the axis of self-rotation of a recess arranged opposite the base plate 323. Upon a rotation of the grill holder 324 around the grilling axis 325, one tooth 321 after another strikes against a tooth 326 arranged preferably on a rear wall of a grill space and which is independent of the movement of the grill holder 324, as a result of which the wheel 320 is turned, for instance, by 90° around its axis 322. This force-engagement element preferably then engages in this position until it strikes the next tooth 326. In the next drive concept shown in FIG. 26, it is provided that each force-transmission element have a gearwheel 330 the axis of rotation 331 of which coincides with an axis of rotation of a receiver arranged on the opposite side of the base plate 323. The gearwheel 330 is driven by travel on an inwardly toothed gear rim 332 which is also preferably arranged fixed, for instance, on a rear wall of an oven-like grill. The last drive concept contemplates that on each axis 335 of self-rotation of a receiver, there is arranged a drive wheel, for instance in the form of a sprocket wheel 336. By a rotating drive belt, in this case a chain 337, the drive wheels 336 are placed in rotation. This chain can also be fixed for instance on a rear wall of an oven-like grill, directly or for instance via another fixed gearwheel similar to the embodiment shown, but the gearwheel 338 can also be externally driven around its axis 339 so that the self-rotation of the receivers can be freely selected within a wide range.

With such drive concepts it is very easily possible, for instance by the pulling-off of the corresponding drive wheels, that one or more mounts for receivers do not also

What is claimed is:

1. A grilling support, rotatable about a grill axis, for the support of materials to be grilled for exposure to a heating surface in which the grill support can be connected using an adapter, at one end to a driven stud axle, characterized in that the grill support (201) includes a base plate (203) which extends at right angles to the grilling axis (202), is preferably circularly shaped, and is self rotating, wherein the adapter (212) is provided centrally on the base place (203), and wherein the base plate (203) has several connectors (300) for interchangeable receivers (204, 205) for the material to be grilled.

2. A grill support according to claim 1, or in particular according thereto, characterized in that the grilling axis (202) is horizontally disposed during the grilling process.

3. A grill support according to one or more of claims 1 and 2, or in particular according thereto, characterized in that the connectors (300) are arranged circularly around the grill axis (302) at uniform angular spacings.

4. A grill support according to claim 1, or in particular according thereto, characterized in that each connector (300) is mounted to the base plate (301) for rotation about its own rotational axis (302) parallel to the grilling axis (202), and in that each connector (300) has a power transferring element (303) through which, by means of a drive, each connector (300) can undergo its own rotation about its rotational axis (302).

5. A grill support according to claim 4, or in particular according thereto, characterized in that each power transferring element includes a gear wheel which is operatively engaged with a gear wheel on the stub axle.

6. A grill support according to claim 4, or in particular according thereto, characterized in that each power transferring element includes a toothed wheel (320) which is in contact with a tooth (326) or a ring of teeth which do not rotate with the grill support (324), for the purpose of creating the individual rotation of the individual receivers.

7. A grill support according to claim 4, or in particular according thereto, characterized in that each power transferring element includes a toothed gear (330) which, in accordance with planetary gear drives, is operatively connected to an internally toothed rim (332), such that the toothed rim (332) circularly encloses the toothed gears (330).

8. A grill support according to claim 4, or in particular according thereto, characterized in that each power transferring element (303) has a toothed gear (304) which is operatively connected to an externally toothed rim, such that the rim is circularly enclosed by the toothed gears (304).

9. A grill support according to claim 4, or in particular according thereto, characterized in that each power transferring element includes a driving gear similar in kind to a pulley or a chain sprocket (336), wherein a driving band similar to a pulley belt or a driving chain (337) extends around all drive wheels (336), and wherein the drive band (337) is driven by a further drive wheel (338) which is independent of the grill support.

10. A grill support according to claim 6, or in particular according thereto, characterized in that the non-rotating tooth (326) the further driving wheel (338) and the toothed rim (332) are supported on a wall, for example a rear wall of a grill similar to a baking oven.

11. A grill support according to claim 1, or in particular according thereto, characterized in that the connectors (300) do not project beyond the upper surface (309) of the base plate (301).

12. A grill support according to claim 4, or in particular according thereto, characterized in that the adapter (212) and the toothed gears (320), the drive wheels (336) and the toothed gears (209) of the power transferring elements (303) are mounted on the underside (206) of the base plate (203) which is opposite the receivers (204,205).

13. A grill support according to claim 4, or in particular according thereto, characterized in that the parts of the power transferring elements (303) which are located on the underside (311) of the base plate (301) are covered by a cover plate (312), such that recesses (313) are provided in the cover plate (312) corresponding to the drive of the power transferring elements (303).

14. A grill support according to claim 1, or in particular according thereto, characterized in that the base plate (203) is dish-shaped with feet (207) on the underside (206).

15. A grill support according to claim 1, or in particular according thereto, characterized in that the base plate (206) has a spit-like central support (214) extending concentrically with respect to the grill axis (202).

16. A grill support according to claim 15, or in particular according thereto, characterized in that central support (214) includes a free space (216) for receding, for example, a heating rod supported on the stub axial.

17. A grill support according to claim 1, or in particular according thereto, characterized in that the central support (276) has individual ribs (278) arranged circularly around the grilling axis (280) and extending longitudinally of the grill axis (280), the ribs forming a shoulder (296).

18. A grill support according to claim 17, or in particular according thereto, characterized in that free-ended individual rods (287) are provided between the individual ribs (278), situated at a distance from the grilling axis (280) which is similar to the rib distance, the rods being secured to the base plate (282), and the free-ends (288) being bent toward the grill axis (280).

19. A grill support according to claim 15, or in particular according thereto, characterized in that the middle support (214) has a slide element (218), on which one or more support units (219, 220) for the material being grilled, and/or one or more receptacles (215), are displaceably guided.

20. A grill support according to claim 15, or in particular according thereto, characterized in that the free-end of the middle support (214) which ends in a point (217) has a connection (238) for a handle (241), by the use of which the grill support (201), by way of the adapter (212), can be connected to the stub axial, or can be removed therefrom.

21. A grill support according to claim 1, or in particular according thereto, characterized by a plate-like receiver (221) of which the plate (222) opening toward the grilling material has a central spike (223).

22. A grill support according to claim 19, or in particular according thereto, characterized by a fork-like securement (220) which, by means of a sliding part (224) is displaceably guided and securable to the slide portion (218) of the central support (214).

23. A grill support according to claim 1, or in particular according thereto, characterized by an opening (205), for example for a shashlik spit, wherein a stop (226) mounted on the connectors (300) receives one end of the spit.

24. A grill support according to claim 23, or in particular according thereto, characterized in that the stop (226) is constituted by a plurality (228) of individual rods (227), wherein the individual rods (227) are bent to form an abutment surface for the material being grilled, wherein the plurality (228) holds a spit (229) centrally.

25. A grill support according to claim 15, or in particular according thereto, characterized by an arm (219) which is displaceably guided by means of a sliding part (230) on the slide portion (218) of the central support (214), the arm having at least one bore (232) and/or a bearing for the rotational mounting of corresponding receiving units (205).

26. A grill support according to claim 1, or in particular according thereto, characterized by a recess (265) insertable in connectors (300), with spring-like tongues (267) circularly located around a rotational axis (266) and extending essentially parallel to the rotational axis, the tongues securely holding between them the material to be grilled.

27. A grill support according to claim 26, or in particular according thereto, characterized in that the radial distance between the tongues and the rotational axis is adjustable.

28. A grill support according to claim 1, or in particular according thereto, characterized in that a receiver (250) is basket-like in construction, with lattice-like walls (251).

29. A grill support according to claim 28, or in particular according thereto, characterized in that the lattice-like walls (251) enclose a space (252) for the material to be grilled, and in that access to the space (252) can be had by opening a portion of a lattice-like wall (253).

30. A grill support according to claim 29, or in particular according thereto, characterized in that the space (252) for the material to be grilled is constructed so as to be rotationally symmetric to the rotational axis (254), and in that the lattice-like walls (251) are constructed as two lattice wall portions (253, 255), each constructed to surround approximately half of the grill space (252), and being pivotalable about a hinge (256).

31. A grill support according to claim 30, or in particular according thereto, characterized in that the lattice-wall portions (253, 255) are held closed by the force of a spring or by way of a bolt (261).

32. A grill support according to claim 1, or in particular according thereto, characterized in that the receiver (205) or the receivers of one or more counter-holders (219) are supported from their ends remote from the connectors.

33. A grill support according to claim 32, or in particular according thereto, characterized in that the counter-holder (219) is shaped like a disc and has bores (232) and/or bearing mounts for several receivers (205) or materials to be grilled.

34. A grill support according to claim 32, or in particular according thereto, characterized in that the counter support (219) is axially displaceably guided and securable by means of a slide part (230) on the slide portion (218) of the middle support (214).

35. A grill support according to claim 32, or in particular according thereto, characterized in that the counter support (219) is resiliently held in the axial direction of the grill axis (202) against the receivers (205) and/or the material to be grilled, by way of the force of a spring (234) which is supported by a shoulder (235) secured to a central support.

36. A grill support according to claim 35, or in particular according thereto, characterized in that the shoulder (235) is provided by a cap (236) provided on the point (217) of the central support (214), the cap being secured in such position.

37. A grill support according to claim 1, or in particular according thereto, characterized by a counter support (289) for grilling materials (277) placed on the middle support (276).

* * * * *